United States Patent
Michiguchi et al.

(10) Patent No.: US 10,988,083 B2
(45) Date of Patent: Apr. 27, 2021

(54) VISUAL FIELD SUPPORT IMAGE GENERATION DEVICE AND IMAGE CONVERSION METHOD

(71) Applicant: PANASONIC INTELLECTUAL PROPERTY MANAGEMENT CO., LTD., Osaka (JP)

(72) Inventors: Masayoshi Michiguchi, Kanagawa (JP); Yoshimasa Okabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/828,493

(22) Filed: Mar. 24, 2020

(65) Prior Publication Data

US 2020/0307456 A1 Oct. 1, 2020

(30) Foreign Application Priority Data

Mar. 29, 2019 (JP) .............................. JP2019-069443
Mar. 29, 2019 (JP) .............................. JP2019-069444
Mar. 29, 2019 (JP) .............................. JP2019-069445

(51) Int. Cl.
*B60R 1/08* (2006.01)
*G02B 27/01* (2006.01)

(52) U.S. Cl.
CPC ............ *B60R 1/08* (2013.01); *G02B 27/0172* (2013.01); *G02B 2027/0183* (2013.01)

(58) Field of Classification Search
CPC .............. B60R 1/08; G02B 2027/0183; G02B 27/0172
USPC ......................................................... 348/148
See application file for complete search history.

(56) References Cited

U.S. PATENT DOCUMENTS

2018/0288403 A1* 10/2018 Cole .................. G02B 27/0172

FOREIGN PATENT DOCUMENTS

| JP | 2013-085142 | 5/2013 | |
| JP | 5562311 | 7/2014 | |
| WO | WO-2018011285 A1 * | 1/2018 | ........... G02B 5/1833 |

* cited by examiner

*Primary Examiner* — Hee-Yong Kim
(74) *Attorney, Agent, or Firm* — Greenblum & Bernstein, P.L.C.

(57) ABSTRACT

A visual field support image generation device for generating a visual field support image of a vehicle has a camera that captures an image from the vehicle and a processing section. The processing section covers the image captured by the camera to generate the visual filed support image. The image is covered by compressing the captured image so that a compression ratio of the captured image in a horizontal direction becomes higher than a compression ratio of the captured image in a vertical direction by using a depth vanishing point included in the captured image as the center.

17 Claims, 19 Drawing Sheets

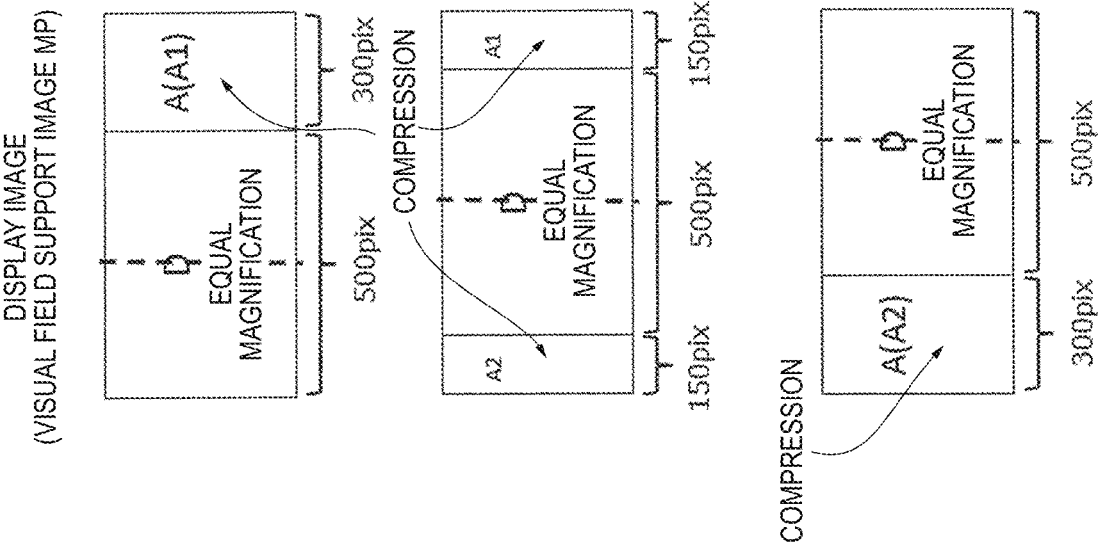
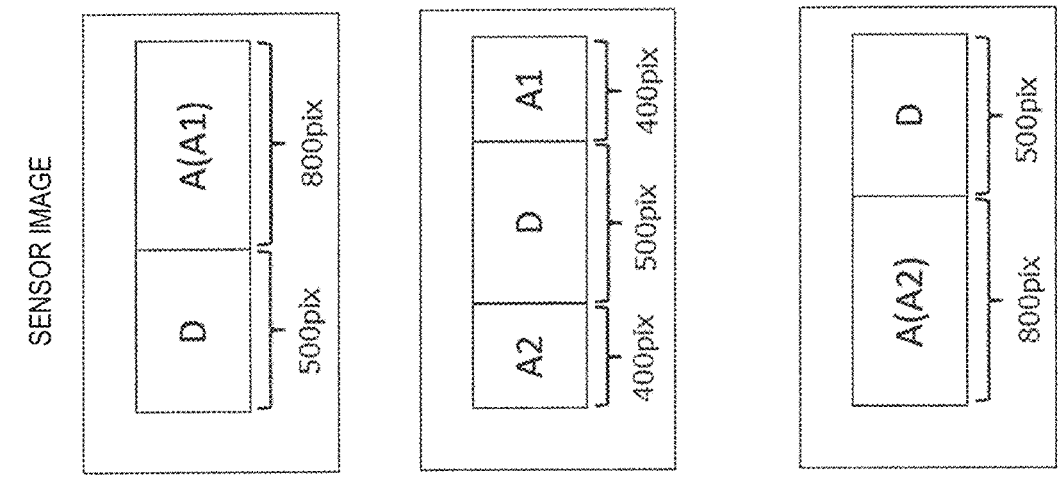
FIG. 12A  INITIAL STATE
FIG. 12B  STATE OF FOLLOWING MOVEMENT
FIG. 12C  END STATE OF FOLLOWING MOVEMENT

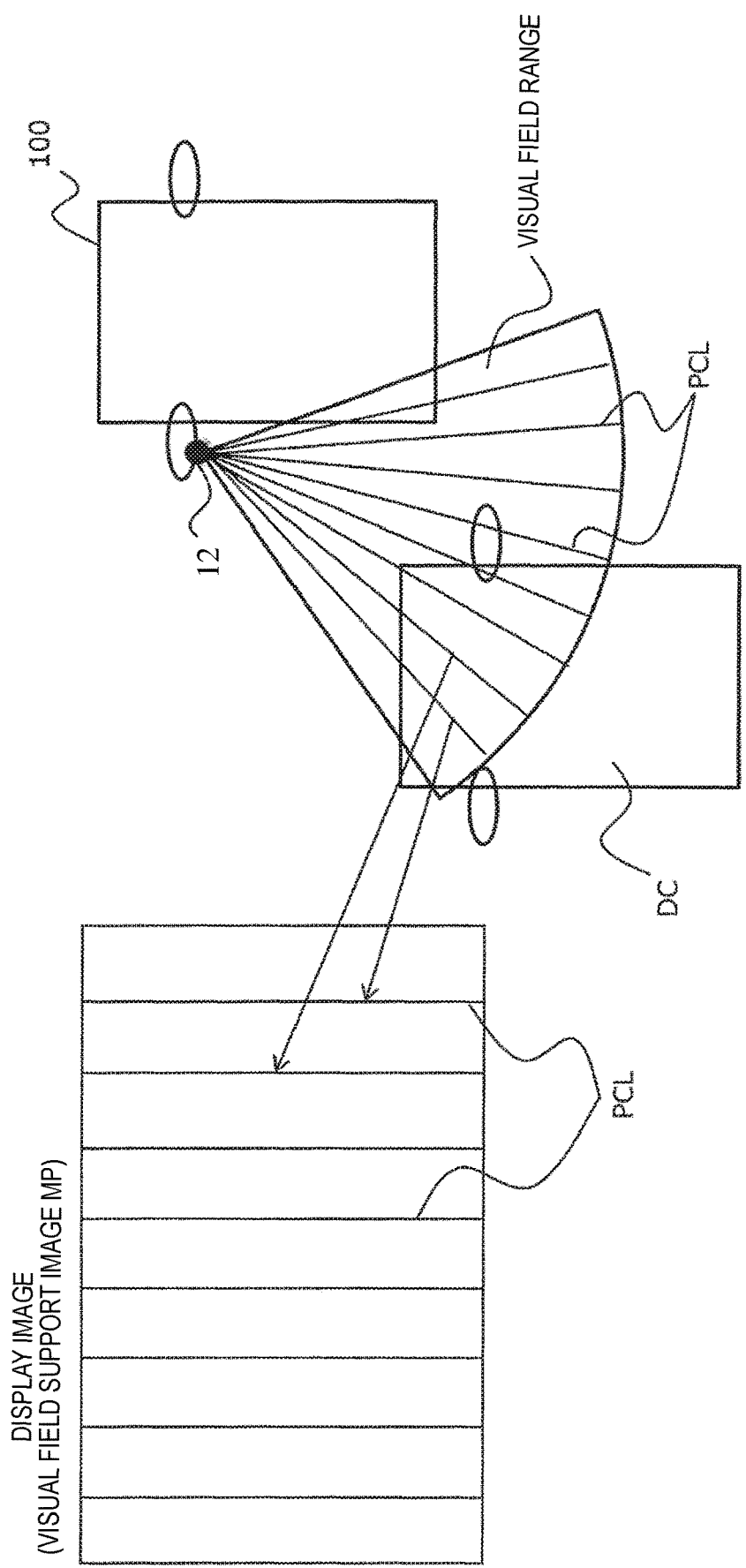

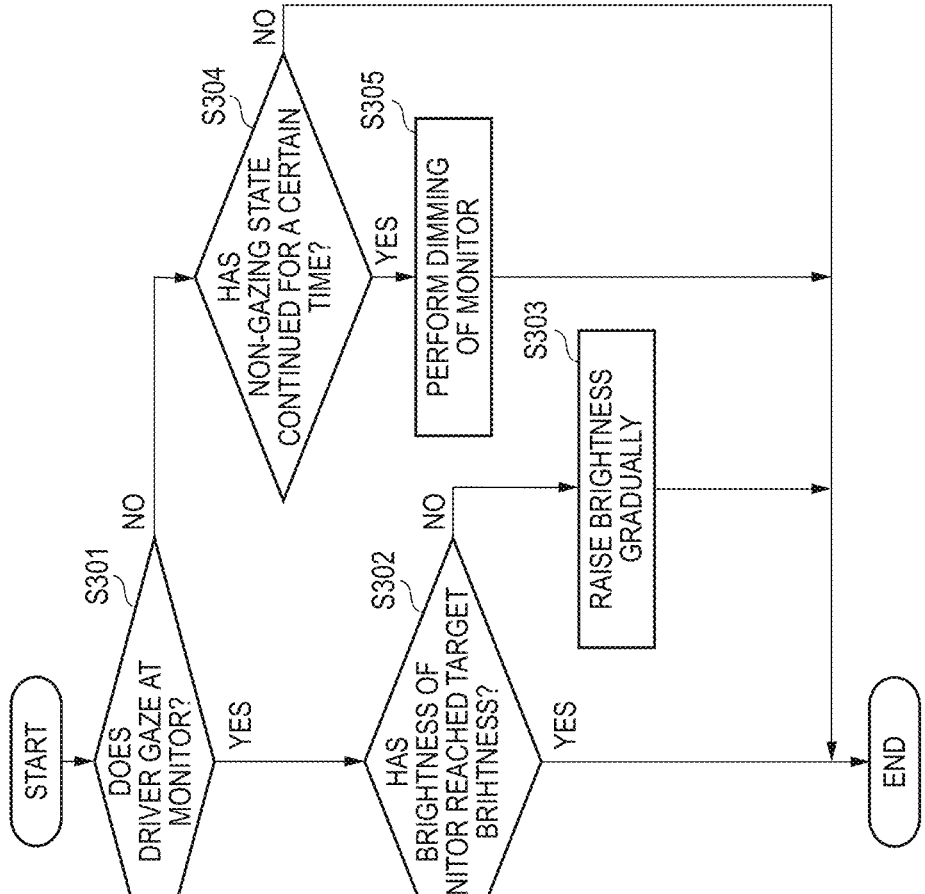
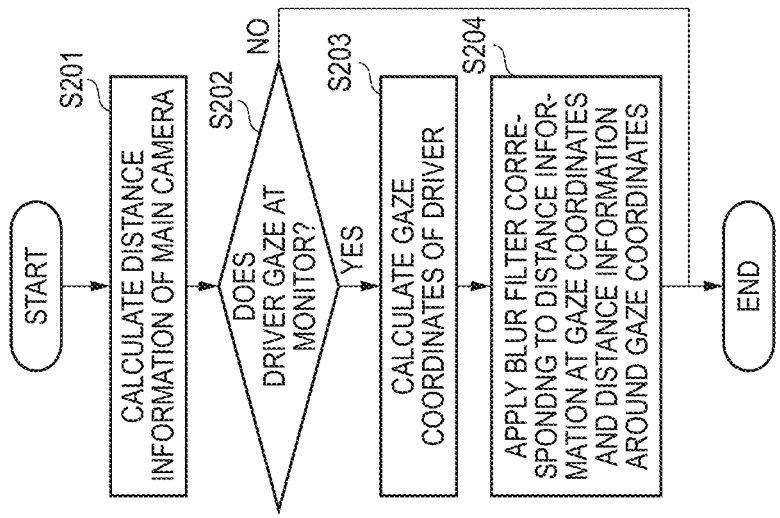
FIG. 19B
FIG. 19A

PRESENT DISCLOSURE

VISUAL FIELD SUPPORT IMAGE GENERATION DEVICE AND IMAGE CONVERSION METHOD

TECHNICAL FIELD

The present invention relates to a device for generating a visual field support image to be displayed to the occupant of a vehicle, and also relates to an image conversion method.

BACKGROUND ART

For a certain type of door mirror of a vehicle, an aspherical mirror serving as an optical mirror is used to reduce blind spots in the horizontal direction (in the left-right direction as viewed from the driver of the vehicle, that is, in the direction away from the own vehicle). FIG. 1 is a schematic view showing an optical aspherical mirror according to a conventional technology, wherein a door mirror M is equipped with an ordinary mirror section M1 and an aspherical section M2. The curvature of the aspherical section M2 is changed so that an image is reflected in a wider range in the horizontal direction.

Also, in the case of a CMS (camera monitoring system) in which the door mirror M is further equipped with a photographing camera, the field angle is extended in the horizontal direction by using a principle similar to that of the aspherical mirror serving as the above-mentioned optical mirror. More specifically, the region corresponding to the aspherical section M2 of the door mirror M in the image captured by the camera is compressed in the horizontal direction, and the image obtained after the compression is displayed on a display device.

Patent document 1 discloses that, in the case that an image obtained by magnifying or compressing a rear side image of a vehicle at a magnification changing in the horizontal direction is displayed on a display device, horizontal scale correction processing for scale-correcting the various portions of the captured image at a preset horizontal expansion/compression ratio is performed in order to prevent a traveling region dividing line, such as a white line, to be extended in the front-rear direction of the own vehicle from being displayed in a curved shape in the image displayed on the display device, and vertical scale correction processing for further scale-correcting the captured image partially in the vertical direction at a preset vertical expansion/compression ratio is performed in order that the image of the traveling region dividing line being displayed in a curved shape in the image whose horizontal scale has been corrected is extended linearly.

PRIOR ART DOCUMENT

Patent Document

Patent Document 1: JP-A-2013-85142

SUMMARY OF INVENTION

From the view point of the occupant of a vehicle, in particular, the driver (hereafter, referred to as the driver or the like), the driver or the like sees the display image displayed on an on-vehicle monitor or the like. The original image of the display image is captured by a camera provided on a door mirror or the like. The display image is desired to be displayed with a reduced sense of incongruity.

Furthermore, since the door mirror is used to allow the driver or the like to grasp the situation outside the vehicle (hereafter referred to as the external world), the display image on the door mirror is desired so that the driver or the like can appropriately grasp the situation in the external world.

From the above-mentioned viewpoint, the present disclosure is intended to provide a display image giving a less sense of incongruity to the driver or the like and allowing the driver to appropriately grasp the situation in the external world.

A visual field support image generation device for generating the visual field support image of a vehicle includes a camera for capturing an image from the vehicle and a processing section. The processing section converts the image captured by the camera to generate the visual field support image, and the image conversion is performed by compressing the captured image so that the compression ratio of the captured image in the horizontal direction becomes higher than the compression ratio of the captured image in the vertical direction by using the depth vanishing point included inside the captured image as the center. With the above-mentioned configuration, the generated visual field support image can reduce a feeling of strangeness and allows the driver or the like to appropriately grasp the situation in the external world.

The present disclosure can provide a display image giving a less sense of incongruity to the driver or the like and allowing the driver or the like to appropriately grasp the situation in the external world.

BRIEF DESCRIPTION OF DRAWINGS

FIG. 2A shows an example of a lens model, and FIG. 2B shows a captured image (input image), and FIG. 2C shows a display image (output image):

FIGS. 12A to 12C are views showing the following movement of the detected vehicle display section D in the visual field support image MP; FIG. 12A shows the initial state of the following movement, FIG. 12B shows the state of the following movement, and FIG. 12C shows the end state of the following movement;

FIG. 14A shows the sensor image, and FIG. 14B shows the visual field support image MP;

FIG. 15 is a view showing allocation based on polar coordinates;

FIGS. 19A and 19B are processing flow charts based on the system configuration shown in FIG. 17; FIG. 19A shows processing for virtually expressing the sense of distance, and FIG. 19B shows luminance dimming processing for the display device 13; and FIGS. 20A to 20 C are views for comparing visual field support images displayed on the display device 13; FIG. 20A is a view showing a gaze point on the display device.

DESCRIPTION OF EMBODIMENTS

On assumptions that a vehicle is a right-hand steering wheel automobile and that a display image is displayed on a display device provided inside the vehicle by using a captured image captured by a camera provided on a right-side door mirror that is apt to have a driver's blind spot, the following detailed descriptions are given while referring to the accompanying drawings as necessary. However, the main subject matters described in the claims are not limited to only these assumptions. For example, various modifications are possible in which a mobile body other than a vehicle may be used; the position of the steering wheel of a vehicle (a left-hand steering wheel vehicle, a right-hand steering wheel vehicle or an autonomous vehicle having no steering wheel) may be changed; and there are various camera installation positions (the left-side door mirror, the right-side door mirror, etc.).

The accompanying drawings and the following descriptions are given so that persons skilled in the art can fully understand the present disclosure and are not intended to limit the main subject matters described in the claims.

Figure 1:
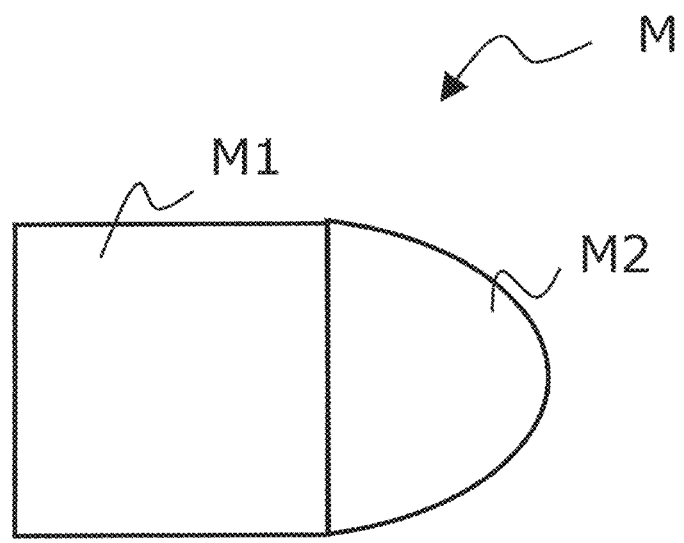
FIG. 1 is a schematic view showing an optical aspherical mirror according to a conventional technology.
Figure 2B:
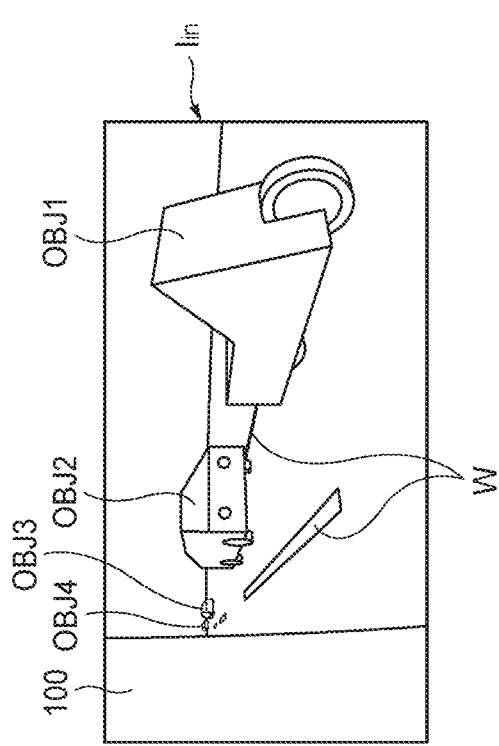
FIGS. 2A to 2C are schematic views showing the principle of image generation by a visual field support image generation device 1 according to the present disclosure.
Figure 2C:
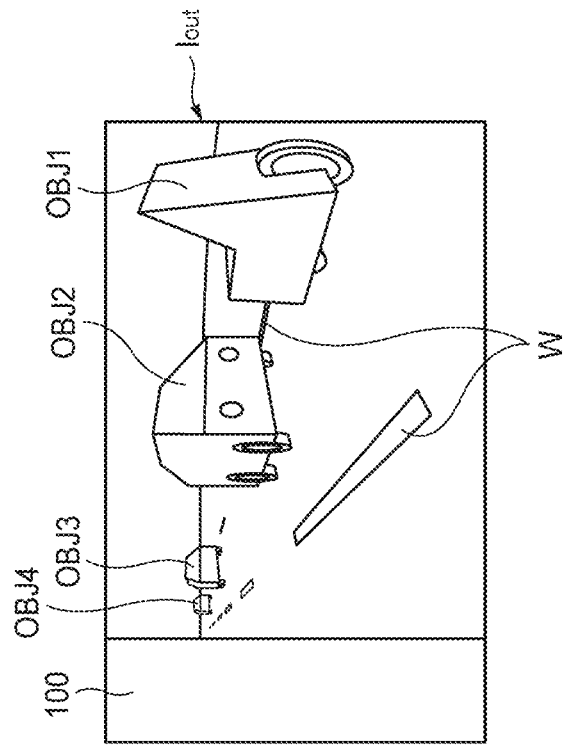
Figure 2A:
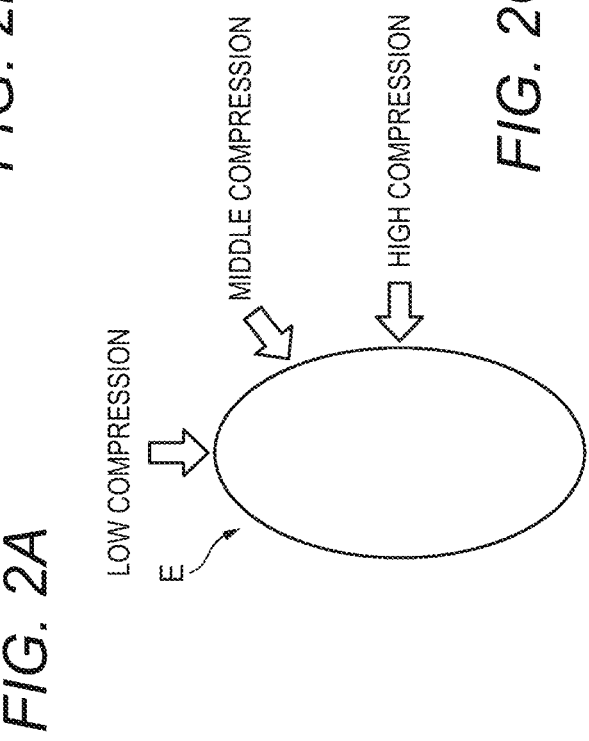

FIG. 2A to 2C are schematic views showing the principle of image generation by a visual field support image generation device 1 (described later referring to FIG. 3) according to the present disclosure. FIG. 2A is a view showing an example of a lens model, FIG. 2B is a view showing a captured image (input image), and FIG. 2C is a view showing a display image (output image).

The visual field support image generation device 1 according to the present disclosure uses a geometrically-shaped lens model capable of compressing the captured image so that the compression ratio of the captured image in the horizontal direction becomes higher than the compression ratio of the captured image in the vertical direction by using the depth vanishing point included inside the captured image as the center. As the geometrically-shaped lens model, the vertically long elliptical lens model E shown in FIG. 2A is used in this embodiment.

Assuming that the length of the major axis (vertical axis) of the vertically long elliptical lens model E is b and that the length of the minor axis (horizontal axis) thereof is c, b>c is established. Furthermore, in the case that the vertically long elliptical lens model E is used, the compression ratio of the image changes linearly from the horizontal direction to the vertical direction as described later. In other words, in the case that the horizontal direction corresponds to a deflection angle of 0 degrees and the vertical direction corresponds to a deflection angle of 90 degrees, the compression ratio decreases linearly as the deflection angle increases from 0 degrees to 90 degrees. Moreover, the compression ratio increases as the distance from the center of the ellipse is larger; this is also described later.

FIG. 2B is a view showing an input image $I_{in}$, and this image corresponds to the captured image captured by the camera installed on the right door mirror of an own vehicle 100 in this embodiment On the left side in the input image $I_{in}$, the vehicle body of the own vehicle 100 is reflected. Furthermore, in the input image $I_{in}$, objects OBJ1 to OBJ4 are reflected although these objects are taken as examples for the purpose of description. In these examples, the objects OBJ1 to OBJ4 are vehicles traveling on the lane adjacent to the lane of the own vehicle 100 and are different from the own vehicle 100.

FIG. 2C is a view showing an output image $I_{out}$ and this image corresponds to a display image displayed toward the driver holding the right-hand steering wheel using a monitor installed inside the own vehicle 100 in this embodiment.

As shown in FIG. 2C, the vehicle body of the own vehicle 100 and the objects OBJ1 to OBJ4 are also reflected in the output image $I_{out}$. When the input image $I_{in}$ (FIG. 2B) is herein compared with the output image $I_{out}$ (FIG. 2C), the compression ratios of the OBJ1 to OBJ4 reflected in the output image $I_{out}$ in the horizontal direction are higher than the compression ratios in the vertical direction. In other words, the field angle in the horizontal direction is expanded. The fact that the output image $I_{out}$ having this feature is a display image giving a less sense of incongruity to the driver or the like and allowing the driver or the like to appropriately grasp the situation in the external world will be described later.

Figure 3:
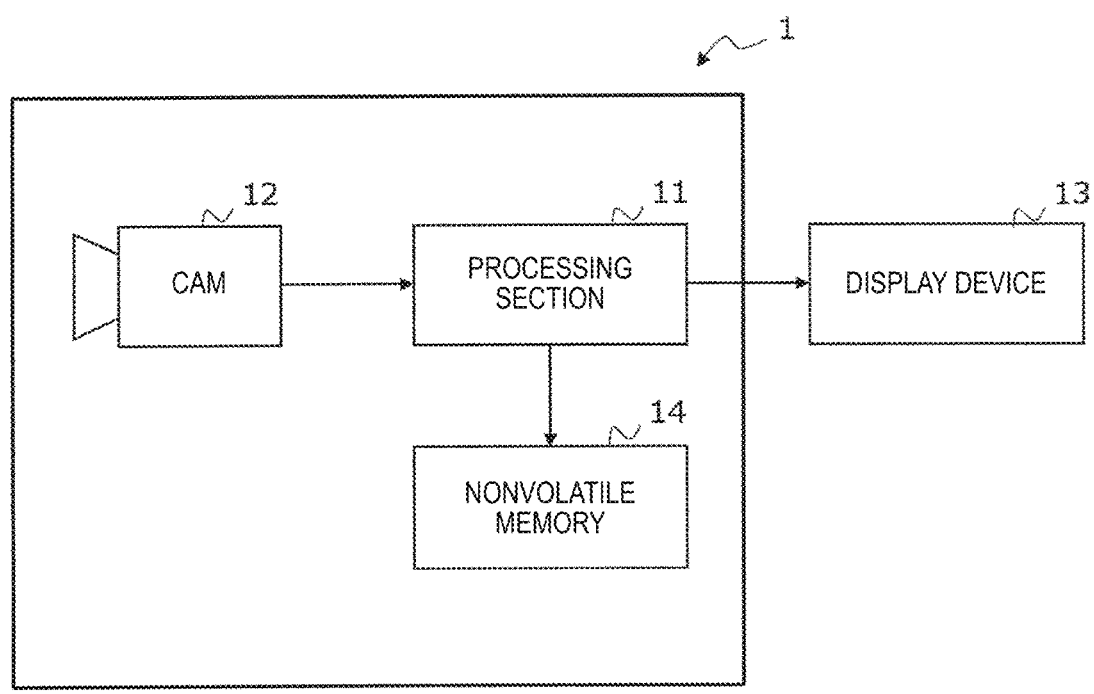
FIG. 3 is a view showing a configuration of an embodiment of the visual field support image generation device 1 according to the present disclosure.

FIG. 3 is a view showing a configuration of an embodiment of the visual field support image generation device 1 according to the present disclosure. The visual field support image generation device 1 according to the present disclosure is equipped with a processing section 11 and a camera 12. However, the visual field support image generation device 1 may be equipped with components other than these components. The visual field support image generation device 1 can be further equipped with a nonvolatile memory 14 and the like as shown in the figure.

The processing section 11 is a component performing information processing in the visual field support image generation device 1. The processing section 11 performs image processing and processes instructions and signals input from the other components inside the device and from the outside of the device. Conversely, the processing section 11 may transmit instructions and signals to the other components inside the device and to the outside of the device.

The camera 12 photographs an image from the vehicle and acquires the above-mentioned input image $I_{in}$. Although the camera 12 is a camera installed on the door mirror to photograph the areas behind and one side of the vehicle in this embodiment, the camera is not limited to be used for this purpose. The camera 12 may be used, for example, as a camera for photographing the area in front of or behind the vehicle.

The display device 13 shown in FIG. 3 is a device capable of displaying the display image generated by the visual field support image generation device 1. Although the display device 13 is typically a monitor or the like installed inside the own vehicle 100, the display device 13 is not limited to such a monitor. It is assumed that the driver or the like sees the display image displayed on the display device 13. Although the display device 13 is separated from the visual field support image generation device 1 in FIG. 3, the display device 13 may be included in the visual field support image generation device 1.

The non-volatile memory 14 may store programs for use in the image processing performed by the processing section 11, various kinds of parameter information, a conversion table based on a complete circle lens model (described later), etc.

The components included in the visual field support image generation device 1 may be integrated further or, conversely, may be divided further into a plurality of subcomponents.

Figure 4:
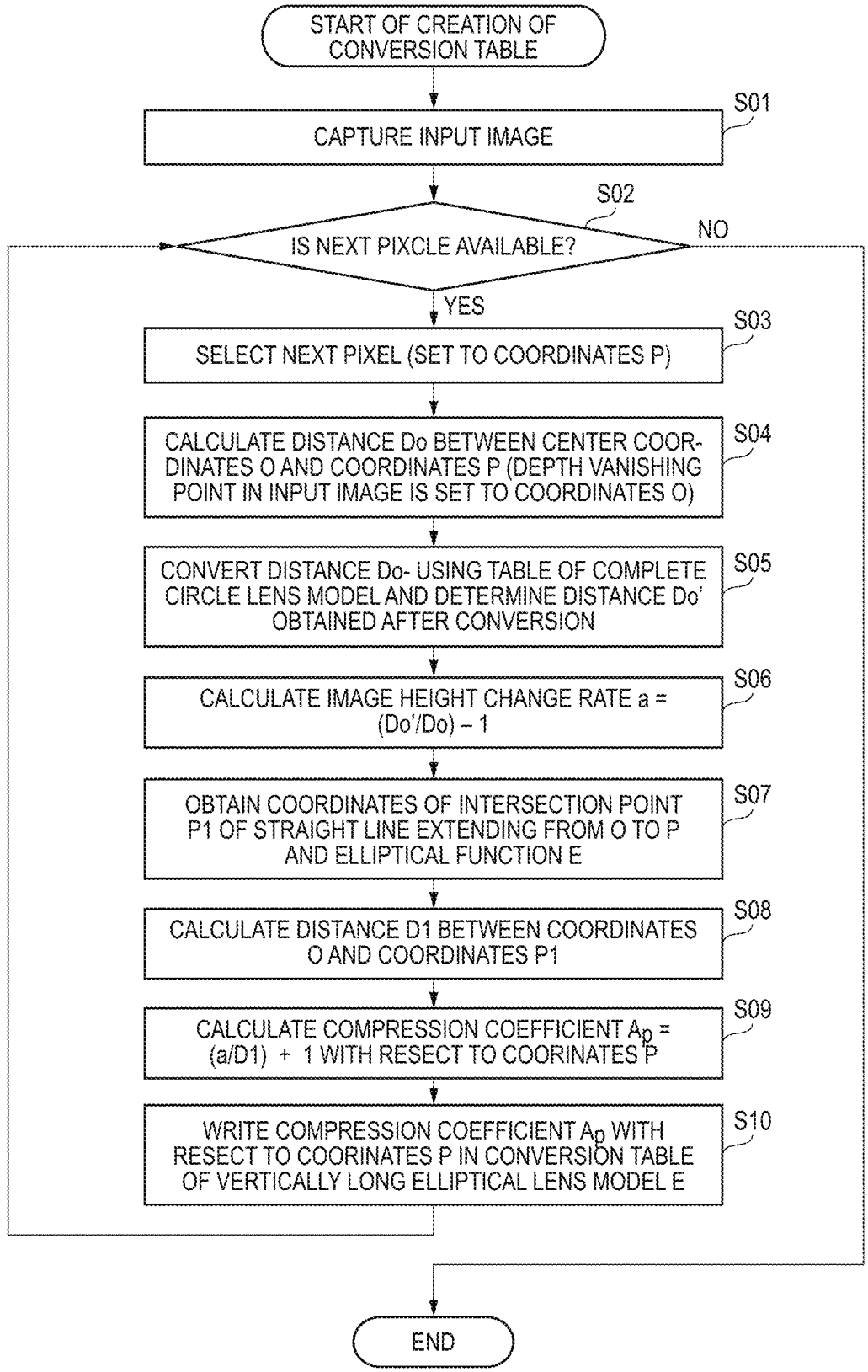
FIG. 4 is a flow chart showing an example of image processing performed by a processing section 11.

FIG. 4 is a flow chart showing an example of image processing performed by the processing section 11.

FIG. 4 shows an example of processing for creating the conversion table that is used to perform image conversion processing for generating the output image $I_{out}$ on the basis of the input image $I_{in}$. In this embodiment, the vertically long elliptical lens model E shown in FIG. 2A is used in this embodiment. Furthermore, as described later referring to FIG. 5, lens distortion is also eliminated in this embodiment.

At step S01, the processing section 11 captures the input image $I_{in}$. The captured image may be stored in a memory or the like, not shown.

At step S02, the processing section 11 determines whether the next pixel to be processed remains or not. In the case that the next pixel remains (Yes in the figure), the processing advances to step S03. In the case that the next pixel does not remain (No in the figure), the entire processing for the input image $I_{in}$ has been completed, and the conversion table creating processing is ended.

At step S03, the processing section 11 selects the next pixel to be processed. It is assumed that the coordinates of the selected pixel are set to be coordinates P for convenience.

At step S04, the processing section 11 calculates the distance Do between center coordinates O and the coordinates P. The center coordinates O indicate the depth vanishing point included in the input image $I_{in}$. In the case that an example is described using FIG. 2B, for example, a plurality of white lines W is drawn on the surface of the road along which the vehicles travel. On the extended lines of the plurality of white lines W, there is a point where the extended lines intersect. This intersection point is the depth vanishing point. In FIG. 2B, the depth vanishing point (the center coordinates O) is located on the upper left side in the image.

At step S05, the processing section 11 converts the distance Do using the conversion table of the complete circle lens model and determines the distance Do' obtained after the conversion. Step S05 is further described below in detail by also referring to FIG. 5.

Figure 5:
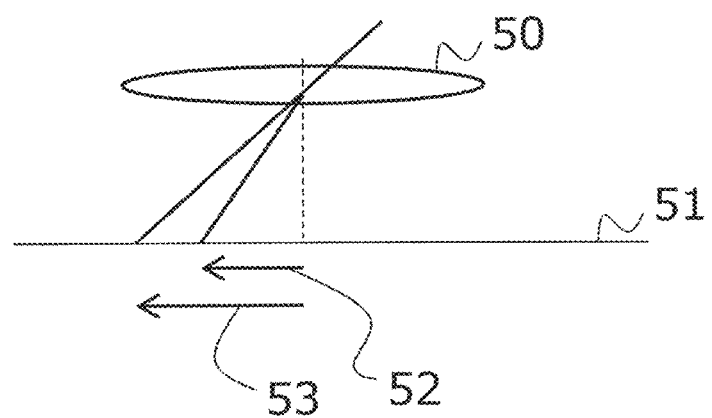
FIG. 5 is a view illustrating a complete circle lens model.

FIG. 5 is a view illustrating the complete circle lens model. The lens 50 shown in FIG. 5 is a general complete circle lens for use in a pinhole camera or the like. FIG. 5 shows a state in which the complete circle lens is viewed from the side instead of the front.

The value of the position of an image on the evaluation surface 51 of an optical system represented by the distance from the optical axis is referred to as an image height. The image height is classified into two types, an ideal image height 53 and an actual image height 52. The ideal image height 53 is an ideal image height. However, since the image height of an ordinary optical system is affected by lens distortion or the like, the ideal image height 53 is not obtained. On the other hand, the actual image height 52 is the image height representing the position where the image is actually formed on the evaluation surface. The distance Do between the center coordinates O and the coordinates P calculated at step S04 corresponds to the actual image height 52.

Furthermore, the actual image heights 52 at respective coordinates are combined with the ideal image heights at respective coordinates to obtain a single conversion table. In the example shown in FIG. 5, the lens 50 is a complete circle lens. Hence, the conversion table obtained by combining the actual image height 52 and the ideal image height 53 shown in FIG. 5 is used as the conversion table of the complete circle lens model. The actual image height 52 affected by lens distortion can be converted into the ideal image height 53 (of the complete circle lens model) from which the lens distortion is eliminated.

The above-mentioned conversion table of the complete circle lens may be stored, for example, in the nonvolatile memory 14. After that, at step S05 described above, the processing section 11 determines the distance Do', which is obtained after the conversion and corresponds to the ideal image height 53 of the complete circle lens, from the distance Do serving as the actual image height 52 by using the conversion table of the complete circle lens model.

At step S06, the processing section 11 calculates an image height change rate 'a' according to the complete circle lens model. The image height change rate 'a' is represented by $a = (Do'/Do) - 1$.

The image height change rate 'a' is a value obtained by dividing the distance Do' serving as the ideal image height 53 of the complete circle lens model by the distance Do serving as the actual image height 52 and then by subtracting 1 therefrom. For example, in the case that the distance Do' serving as the ideal image height 53 is 120 and that the distance Do serving as the actual height 52 is 100, the image height change rate a=(120/100)−1=0.2 is obtained. This means that the ideal image height 53 of (the complete circle lens model) has changed (increased in this case) 20% with respect to the actual image height 52.

The visual field support image generation device 1 according to the present disclosure herein uses the vertically long elliptical lens model E (FIG. 2A) as already described above. For this reason, it is necessary to mix the element of the vertically long ellipse in the image height change rate 'a' that is calculated at step S06. Hence, the following processing is performed at step S07 and the subsequent steps.

At step S07, the processing section 11 calculates the coordinates of the intersection point P1 of the straight line extending from the coordinates O to the coordinates P and the vertically long elliptical function E that is defined by the major axis b and the minor axis c. At the next step S08, the processing section 11 calculates the distance D1 between the coordinates O and the coordinates P1.

The lengths of the major axis b and the minor axis c can be determined appropriately. Since the vertically long elliptical lens model E is used in this embodiment, the major axis b extends in the vertical direction (the Y-axis direction) and the minor axis c extends in the horizontal direction (the X-axis direction). It is thus assumed that c<b.

Two specific examples are herein shown for easy understanding.

First, a first specific example is shown. It is assumed that the coordinates P are located on the X-axis in the case that the coordinates O are used as the origin. In other words, it is assumed that the coordinates P=(m, 0), wherein m is an arbitrary positive real number. At this time, since the coordinates of the intersection point P1 of the straight line extending from the coordinates O to the coordinates P and the vertically long elliptical function E are (c/2, 0), an equation D1=c/2 is established.

A second specific example is shown. It is assumed that the coordinates P are located on the Y-axis in the case that the coordinates O are used as the origin. In other words, it is assumed that the coordinates P=(0, n), wherein n is an arbitrary positive real number. At this time, since the coordinates of the intersection point P1 of the straight line extending from the coordinates O to the coordinates P and the vertically long elliptical function E are (0, b/2), an equation D1=b/2 is established.

When the above-mentioned two specific examples are compared with each other, c/2<b/2 is established because of c<b. In other words, the value of the distance D1 in the second specific example is larger than that in the first specific example.

At the next step S09, the processing section 11 calculates the compression coefficient Ap=(a/D1)+1 with respect to the coordinates P. As described above, a is the image height change rate and D1 is the distance from the coordinates O to the coordinates P1. Since D1 is used as a reciprocal, the magnitude relationship of the values is reversed between the above-mentioned two specific examples. In other words, the compression coefficient Ap=(2a/c)+1 in the first specific example is larger than the compression coefficient Ap=(2a/b)+1 in the second specific example. The compression coefficient Ap corresponds to the compression ratio.

In other words, the compression coefficient Ap in the first specific example wherein the coordinates P=(m, 0) in the horizontal direction is larger than the compression coefficient Ap in the second specific example wherein the coordinates P=(0, n) in the vertical direction. This indicates that the compression ratio in the horizontal direction is higher than the compression ratio in the vertical direction by using the coordinates O (depth vanishing point) as the center.

In the next step S10, the processing section 11 writes the compression coefficient Ap with respect to the coordinates P in the conversion table of the vertically long elliptical lens model E as the ideal image height 53 of the vertically long elliptical lens model. In other words, the actual image height 52 and the ideal image height 53 of the vertically long elliptical lens model E are combined and recorded. The conversion table of the vertically long elliptical lens model E is a modification of the conversion table of the above-mentioned complete circle lens model as understood from the above-mentioned descriptions.

And then, the processing returns to step S02. That is to say, for all the pixels (the coordinates P) included in the input image $I_{in}$ captured by the processing section 11 at the above-mentioned step S01, the combination of the actual image height 52 and the ideal image height 53 of the vertically long elliptical lens model E are combined and recorded and then used as the conversion table of the vertically long elliptical lens model E.

As described above, the conversion table of the vertically long elliptical lens model E can be created by modifying the conversion table of the complete circle lens model.

Furthermore, the output image $I_{out}$ can be generated by applying the conversion table of the vertically long elliptical lens model E to the input image $I_{in}$. More specifically, the line segment extending from the coordinates O to the coordinates P in the input image $I_{in}$ is compressed Ap times (the distance Do is changed to a distance Do/Ap). In this compression, the compression ratio in the horizontal direction in the case that coordinates O (the depth vanishing point) are used as the center is higher than the compression ratio in the vertical direction.

The lengths of the major axis b and the minor axis c of the vertically long elliptical lens model E can be changed appropriately. More specifically, in the visual field support image generation device 1 according to the present disclosure, the compression ratio in the horizontal direction and the compression ratio in the vertical direction in the case that coordinates O (the depth vanishing point) are used as the center can be adjusted separately and independently.

Figure 6A:
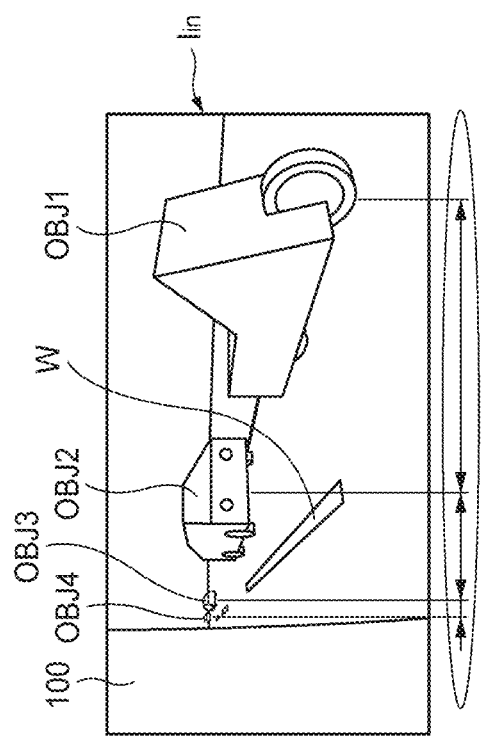
FIGS. 6A to 6C are comparison views in the case that an output image $I_{out}$ is generated from an input image $I_{in}$, wherein the output image obtained by the conventional technology is compared with the output image obtained by the visual field support image generation device 1 according to the present disclosure.
Figure 6B:
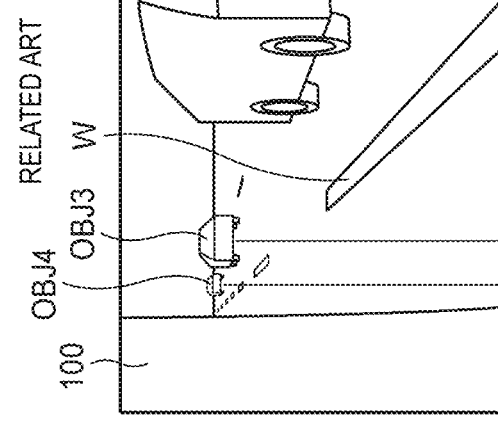
Figure 6C:
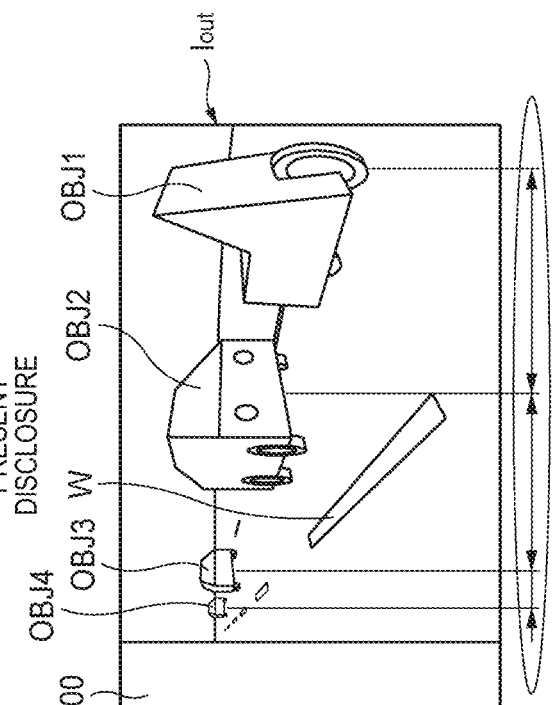

FIGS. 6A to 6C are comparison figures in the case that the output image $I_{out}$ is generated from the input image $I_{in}$, wherein the output image obtained by the conventional technology is compared with the output image obtained by the visual field support image generation device 1 according to the present disclosure. FIG. 6A shows the input image $I_{in}$. FIG. 6B shows the output image $I_{out}$ that is generated from the input image $I_{in}$ using the conventional technology. FIG. 6C shows the output image $I_{out}$ that is generated from the same input image $I_{in}$ using the visual field support image generation device 1 according to the present disclosure.

In the input image $I_{in}$ shown in FIG. 6A, the vehicle body of the own vehicle 100 is reflected on the left side. Furthermore, the objects OBJ1 to OBJ4 are reflected in the input image $I_{in}$ although these objects are taken as examples for the purpose of description. The objects OBJ1 to OBJ4 taken as the examples are vehicles traveling on the lane adjacent to the lane on which the own vehicle 100 travels and are different from the own vehicle 100.

The output image $I_{out}$ generated by the conventional technology and shown in FIG. 6B is expanded and contracted in the horizontal direction and then further expanded and contracted in the vertical direction in order to straighten the white line W reflected in the input image Iin. In other words, the expansion and the contraction are performed in two steps in the horizontal direction and the vertical direction. The expansion and the contraction are also performed in two steps in the cases shown in FIGS. 7B and 8B as described later.

The shapes of the objects OBJ1 to OBJ4 serving as vehicles in the output image $I_{out}$ shown in FIG. 6B are significantly different from the shapes shown in the input image $I_{in}$. The shapes of the objects are significantly crushed in the horizontal direction to the extent that their original shapes are hardly recognized. Furthermore, the sense of distance in the horizontal direction is changed significantly, whereby the distance between the object OBJ1 and the object OBJ2 is shortened extremely. In the case that this image is seen from the viewpoint of the driver or the like, although the driver can perceive the fact that some objects are present there, he or she hardly distinguishes the objects. Moreover, actually, the distance between the object OBJ1 and the object OBJ2 is sufficient (as shown in FIG. 6A). However, in FIG. 6B, the objects are seen as if they collide with each other.

On the other hand, in the case of the output image $I_{out}$ shown in FIG. 6C and generated by the visual field support image generation device 1 according to the present disclosure, the shape change of the three-dimensional objects is moderate. In addition, the change in the sense of distance in the horizontal direction is also moderate. Hence, the shapes of the objects OBJ1 to OBJ4 moving on the adjacent lane are easily recognized from the viewpoint of the driver or the like. What's more, confusion due to abrupt change in the sense of distance does not occur.

Figure 7A:
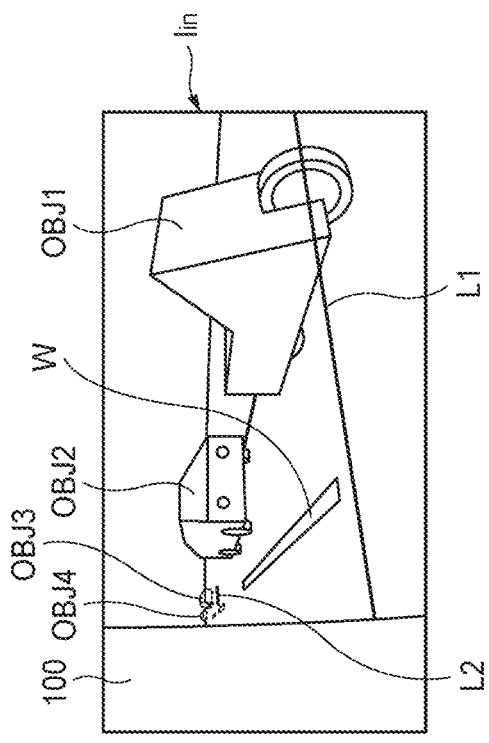
FIGS. 7A to 7C are second comparison views in the case that the output image $I_{out}$ is generated from the input image $I_{in}$, wherein the output image obtained by the conventional technology is compared with the output image obtained by the visual field support image generation device 1 according to the present disclosure.
Figure 7B:
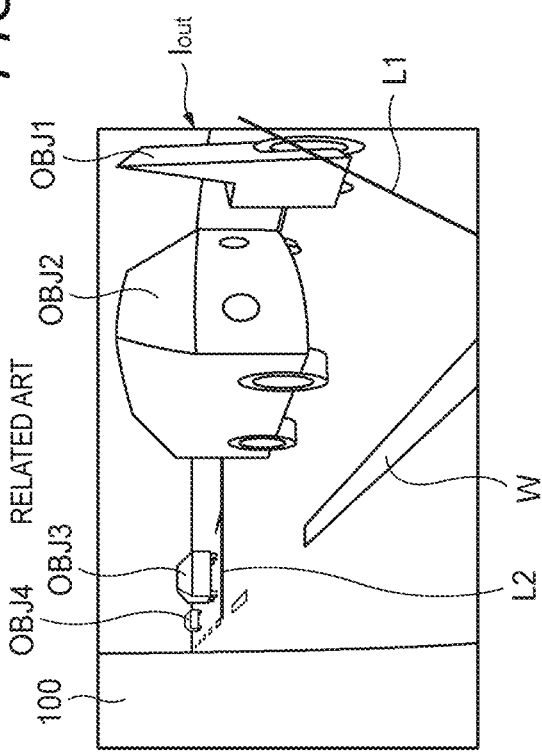
Figure 7C:
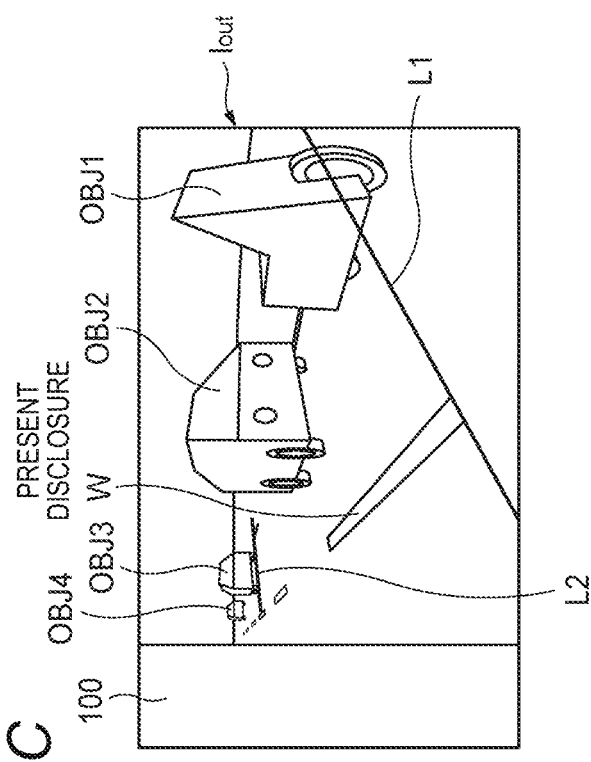

FIGS. 7A to 7C are second comparison figures in the case that the output image $I_{out}$ is generated from the input image $I_{in}$, wherein the output image obtained by the conventional technology is compared with the output image obtained by the visual field support image generation device 1 according to the present disclosure. FIG. 7A shows the input image $I_{in}$. FIG. 7B shows the output image $I_{out}$ that is generated from the input image $I_{in}$ using the conventional technology. FIG. 7C shows the output image $I_{out}$ that is generated from the same input image $I_{in}$ using the visual field support image generation device 1 according to the present disclosure.

In FIGS. 7A to 7C, straight lines L1 and L2 orthogonal to the traveling direction of the own vehicle 100 are added as auxiliary lines. The straight line L1 is a line close to the own vehicle 100 and the straight line L2 is a line away from the own vehicle 100.

In the input image $I_{in}$ shown in FIG. 7A, the two straight lines are parallel to each other.

In the output image $I_{out}$ shown in FIG. 7B and generated by the conventional technology, the inclinations of the two straight lines L1 and L2 are significantly different from each other. This difference in inclination is recognized as the distortion of the image and the sense of incongruity from the viewpoint of the driver or the like. Furthermore, the plurality of vehicles reflected in the image is traveling in the direction orthogonal to the two straight lines L1 and L2. In other words, in the case that the output image $I_{out}$ is a video, a vehicle reflected inside the video is reflected as if the vehicle travels while making a curve as the vehicle travels to the right side of the image, although it is supposed that the vehicle actually travels straight. This is also recognized as the sense of incongruity from the viewpoint of the driver or the like.

On the other hand, in the case of the output image $I_{out}$ shown in FIG. 7C and generated by the visual field support image generation device 1 according to the present disclosure, the difference in inclination between the two straight lines L1 and L2 is more moderate than the difference in the case of the conventional technology. Hence, the sense of incongruity is reduced from the viewpoint of the driver or the like. In the case that the output image $I_{out}$ is a video, the traveling of a vehicle reflected in the video is seen more natural, and the sense of incongruity is also reduced.

Figure 8A:
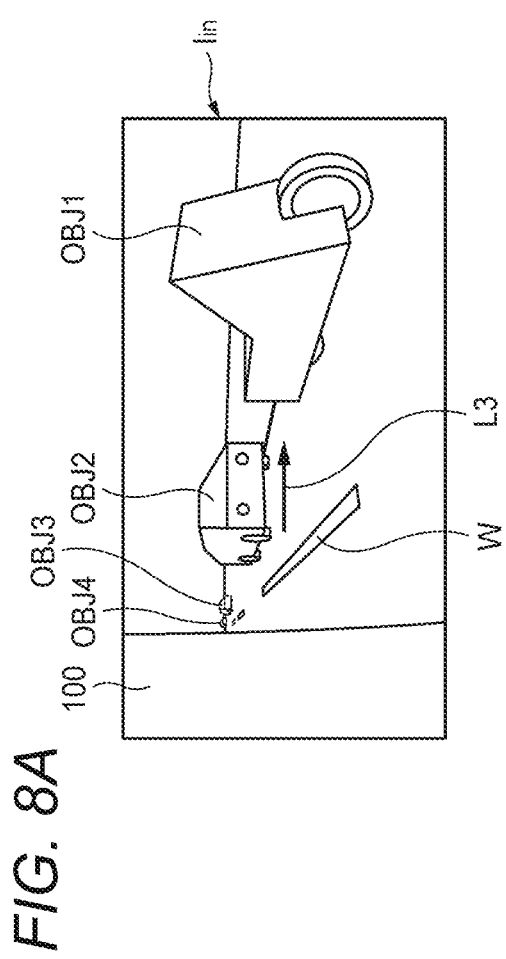
FIGS. 8A to 8C are third comparison views in the case that the output image $I_{out}$ is generated from the input image $I_{in}$, wherein the output image obtained by the conventional technology is compared with the output image obtained by the visual field support image generation device 1 according to the present disclosure.
Figure 8C:
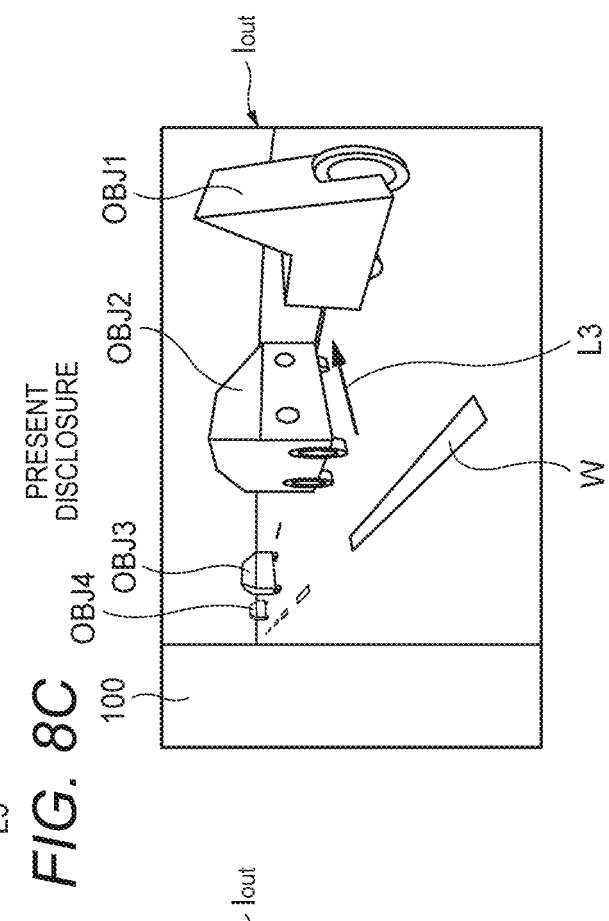
Figure 8B:
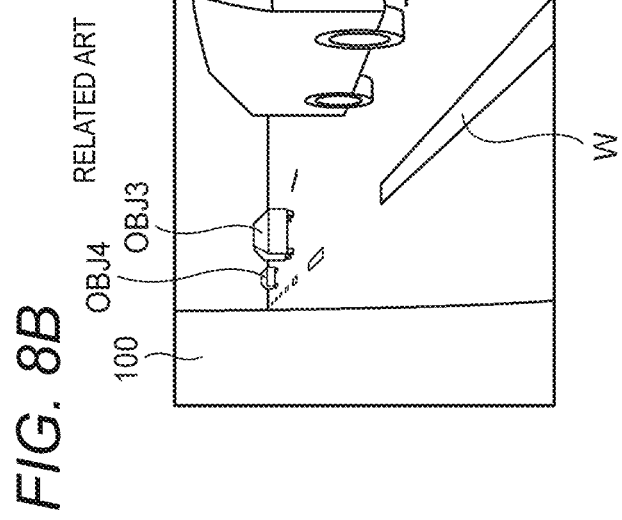

FIGS. 8A to 8C are third comparison figures in the case that the output image $I_{out}$ is generated from the input image $I_{in}$, wherein the output image obtained by the conventional technology is compared with the output image obtained by the visual field support image generation device 1 according to the present disclosure. FIG. 8A shows the input image Ii $I_{in}$ n. FIG. 8B shows the output image $I_{out}$ that is generated from the input image $I_{in}$ using the conventional technology. FIG. 8C shows the output image $I_{out}$ that is generated from the same input image $I_{in}$ using the visual field support image generation device 1 according to the present disclosure.

In FIGS. 8A to 8C, an explanatory arrow L3 is provided near the front bumper of the object OB2 serving as a vehicle. This arrow L3 indicates a straight line orthogonal to the traveling direction of the own vehicle 100, the straight line being provided for an object to be reflected in the image.

In the output image $I_{out}$ shown in FIG. 8B and generated by the conventional technology, the arrow L3 is seen to be curved. In other words, from the viewpoint of the driver or the like, a member (a front bumper or the like) constituting the object OB2 and being formed in a straight form is seen to be curved. This is also recognized as a sense of incongruity from the viewpoint of the driver or the like.

On the other hand, in the case of the output image $I_{out}$ shown in FIG. 8C and generated by the visual field support image generation device 1 according to the present disclosure, the above-mentioned curvature is reduced, whereby the member (the front bumper or the like) formed into the straight shape is seen to the driver or the like as a shape close to a straight shape. That is to say, the sense of incongruity is reduced from the viewpoint of the driver or the like.

As exemplified above, the output image $I_{out}$ generated by the visual field support image generation device 1 according to the present disclosure becomes an image with a reduced sense of incongruity from the viewpoint of the driver or the like.

In addition, in the output image $I_{out}$ generated by the visual field support image generation device 1 according to the present disclosure is obtained by compressing the captured image so that the compression ratio of the captured image in the horizontal direction becomes higher than the compression ratio of the captured image in the vertical direction by using the depth vanishing point included inside the captured image as the center (see FIGS. 1 to 5). Hence, the advantage of an optical aspherical mirror in which the field angle is expanded in the horizontal direction can still be taken.

In other words, the visual field support image generation device 1 according to the present disclosure can generate the output image $I_{out}$ giving a less sense of incongruity to the driver or the like and allowing the driver or the like to appropriately grasp the situation in the external world.

Some supplementary matters will be described below.

The flow chart described referring to FIG. 4 provides an example in which the conversion table of the vertically long elliptical lens model E is created on the basis of the conversion table of the complete circle lens model and the output image $I_{out}$ is generated using the conversion table of the vertically long elliptical lens model E. Once the conversion table of the vertically long elliptical lens model E is stored in the nonvolatile memory 14 or the like, it is not necessary to newly create the conversion table each time the input image $I_{in}$ is input. In other words, for the input image $I_{in}$, the output image $I_{out}$ can be generated by referring to the conversion table of the vertically long elliptical lens model E having been stored in the memory. Conversely, the output image $I_{out}$ may be generated by dynamically calculating the compression coefficient Ap as described above each time the input image $I_{in}$ is input.

Furthermore, in the above-mentioned embodiment, the processing section 11 performs the processing relating to steps S01 to S10. The program relating to the processing may be stored in the nonvolatile memory 14 or the like, and the processing section 11 may read the program and then may perform image processing. On the other hand, the above-mentioned processing may be performed by hardware processing instead of software processing. For example, the processing may be performed using a special-purpose circuit or the like.

Next, a supplemental explanation for the compression ratio will be given. The two specific examples have been given for step S09 shown in FIG. 4. In other words, with respect to the compression ratio (the compression coefficient Ap), a comparison has been made in two directions, that is, the horizontal direction (the first specific example) and the vertical direction (the second specific example). However, a compression ratio in an oblique direction between the two directions is available. As described above, the conversion table of the vertically long elliptical lens model E is obtained by modifying the conversion table of the above-mentioned complete circle lens model. Since the complete circle is converted into the vertically long ellipse, the compression ratio (the compression coefficient Ap) changes linearly from the horizontal direction to the vertical direction (see FIG. 2A). In other words, in the case that the horizontal direction corresponds to the deflection angle of 0 degrees and the vertical direction corresponds to the deflection angle of 90 degrees, the compression ratio (the compression coefficient) decreases linearly as the deflection angle increases.

Moreover, as the complete circle lens model, a lens model in which the compression ratio increases as the distance from the center is larger. The compression ratio of the vertically long elliptical lens model E created on the basis of the complete circle lens model also increases as the distance from the center (the depth vanishing point) is larger.

Next, a visual field support image generation device 1B will be described in which an aspherical portion is made movable in order to accomplish the object of the present disclosure, that is, in order to provide a display image giving a less sense of incongruity to the driver or the like and allowing the driver or the like to appropriately grasp the situation in the external world.

The driver or the like riding in a vehicle provided with a CMS (camera monitoring system) sees a visual field support image on a display device installed in the vehicle. However, the visual field support image generated by using the visual field support image generation device according to the conventional technology is more compressed toward one side end section of the visual field support image, the one side end section being a portion corresponding to the aspherical section M2 (see FIG. 1) of the door mirror M serving as an optical mirror. Hence, the driver or the like seeing the visual field support image feels a sense of incongruity.

Figure 9:
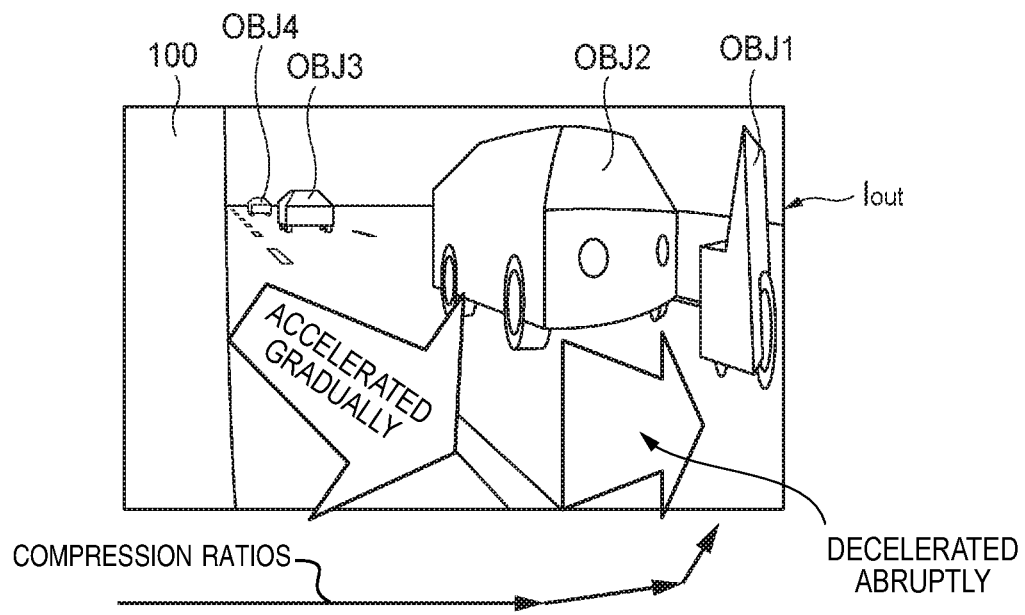
FIG. 9 is a view showing the visual field support image (output image) $I_{out}$ generated using the visual field support image generation device according to the conventional technology.

An example is shown using FIG. 9. FIG. 9 is a view showing the visual field support image (output image) $I_{out}$ generated using the visual field support image generation device according to the conventional technology. Black arrows are added at the lower section of FIG. 9 to indicate compression ratios. More specifically, the compression ratio becomes higher toward the right side of the visual field support image (output image) $I_{out}$.

In the visual field support image (output image) $I_{out}$, a situation is reflected in which the object OBJ2 serving as a vehicle is traveling on the lane adjacent to the lane of the own vehicle 100 and approaching the own vehicle 100 from behind and then passing the own vehicle 100. At this time, as the object OBJ2 moves to the right side of the visual field support image (output image) $I_{out}$ corresponding to the above-mentioned aspherical section M2, the shape of the object OBJ2 is crushed significantly by image compression. The problem of crushing can be understood intuitively by comparing the object OBJ1 being crushed significantly in the left-right direction shown in FIG. 9 with the object OBJ2 shown in FIG. 9 and being less crushed than the object OBJ1 in the left-right direction.

Furthermore, the traveling speed of the object OBJ2 on the visual field support image (output image) $I_{out}$ appears to increase gradually as the object OBJ2 becomes close to the own vehicle 100. On the other hand, since the image is compressed on the right side of the image corresponding to the aspherical section M2, the traveling speed of the object OBJ2 appears to decrease abruptly. Hence, the object OBJ2 serving as a vehicle appears to become close to the own vehicle 100 while being gradually accelerated and then appears to pass the own vehicle 100 while being abruptly decelerated from the viewpoint of the driver or the like. This image display causes a significant sense of incongruity.

Hence, in the visual field support image generation device 1B according to the present disclosure, the above-mentioned sense of incongruity is suppressed from being generated in the optical aspherical mirror-shaped image display using the CMS (camera monitoring system). In order that this is accomplished, the method for compressing the display section corresponding to the aspherical section of the optical aspherical mirror is changed depending on the vehicle display position.

More specifically, the high compression portion inside the visual field support image is set to a portion other than the detected vehicle DC (described later) displayed inside the visual field support image. Furthermore, the compression strength at the position where the detected vehicle DC is displayed is prevented from being changed abruptly.

The visual field support image generation device 1B according to the present disclosure described above can provide the visual field support image without the sense of incongruity from the viewpoint of the driver or the like. Furthermore, since the visual field support image still has a portion corresponding to the aspherical section, display having high field angles is made possible. The visual field support image generation device 1B according to the present disclosure having these features will be described below in detail.

Figure 10:
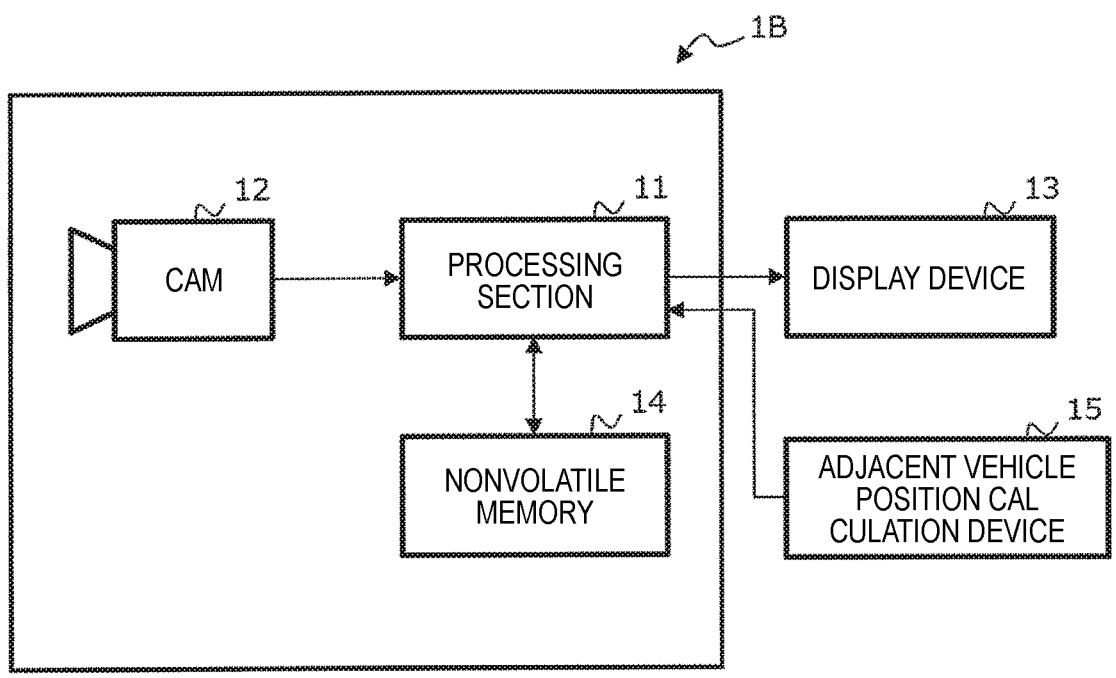
FIG. 10 is a view showing a configuration of an embodiment of a visual field support image generation device 1B according to the present disclosure.

FIG. 10 is a view showing a configuration of an embodiment of the visual field support image generation device 1B according to the present disclosure. The various devices shown in FIG. 10 are provided in the own vehicle 100. The hardware configuration shown in FIG. 10 is basically similar to that of the visual field support image generation device 1 described referring to FIG. 3. The embodiment shown in FIG. 10 is different from the embodiment shown in FIG. 3 in that the visual field support image generation device 1B is connected to an adjacent vehicle position calculation device 15.

The adjacent vehicle position calculation device 15 may be, for example, a millimeter wave radar installed, for example, inside the rear bumper of the vehicle and can detect a vehicle traveling on the adjacent lane and can calculate the position of the vehicle. However, the vehicle traveling on the adjacent lane may be detected using another distance measurement device, such as a TOF sensor.

Furthermore, the adjacent vehicle position calculation device 15 may be, for example, the camera 12. In other words, the external world (the adjacent lane in particular) viewed from the own vehicle 100 may be captured using the camera 12, and the position of the vehicle traveling on the adjacent lane may be obtained from the captured image by software processing.

In the above respective cases, it is common that adjacent vehicle position calculation device 15 calculates the position of the most adjacent vehicle (hereafter referred to as the detected vehicle DC) traveling on the lane adjacent to the lane of the own vehicle 100. The most adjacent vehicle described above has the highest risk of causing a collision with the own vehicle 100. The visual field support image generation device 1B acquires the position information of the detected vehicle DC from the adjacent vehicle position calculation device 15, thereby being capable of performing image processing as described later.

Figure 11B:
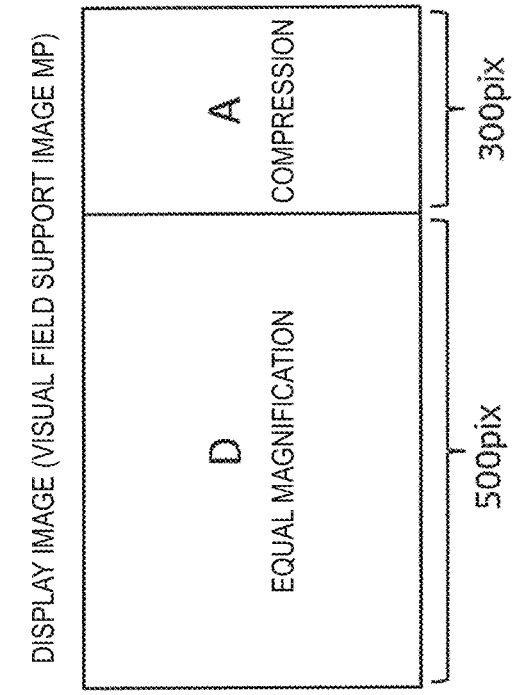
FIG. 11B is a view showing a visual field support image MP displayed on a display device 13.
Figure 11A:
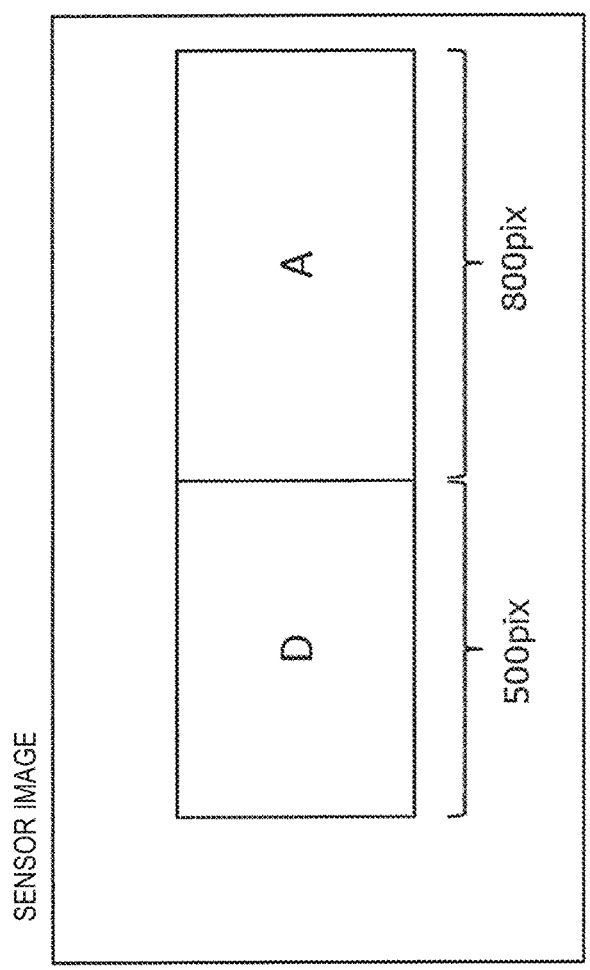
FIG. 11A is a view showing a sensor image captured by the camera 12 provided in the visual field support image generation device 1B according to the present disclosure.

FIGS. 11A and 11B are views showing a sensor image captured by the camera 12 provided in the visual field support image generation device 1B according to the present disclosure and a visual field support image MP displayed on the display device 13. The visual field support image MP is an image corresponding to the above-mentioned output image $I_{out}$ and displayed on the display device 13. The driver or the like riding in the own vehicle 100 sees the visual field support image MP displayed on the display device 13. Since the situation of the own vehicle 100 in the external world is included in the visual field support image MP, the visual field support image MP is used to support the visual field of the driver or the like.

As shown in FIG. 11B, the visual field support image MP has a detected vehicle display section D and an aspherical section A. The detected vehicle display section D is a region on the image in which the detected vehicle DC, the position of which is acquired by the above-mentioned adjacent vehicle position calculation device 15, is reflected. On the other hand, the aspherical section A is a region on the image corresponding to the aspherical section M2 in the above-mentioned optical aspherical mirror.

Basically, the compression ratio in the aspherical section M2 of the optical aspherical mirror is made higher than that in the other portions of the optical mirror in order to extend the viewing angle reflected in the mirror. Similarly, the compression ratio in the aspherical section A of the visual field support image MP is made higher than that in the detected vehicle display section D. However, on the CMS (camera monitoring system), the detected vehicle display section D is not necessarily required to be displayed at equal magnification. The detected vehicle display section D can be compressed at a constant compression ratio and the aspherical section A can be compressed at a higher compression ratio. In any case, in the visual field support image generation device 1B according to the present disclosure, the total number of pixels to be compressed and the compression ratio around the detected vehicle DC are determined beforehand.

(Specifying Display Quantity)

An example is described in which the compression ratio in the detected vehicle display section D is one (equal magnification). First, the final display field angle of the visual field support image MP capable of being visually recognized on the display device 13 by the driver or the like, is specified. The number of pixels on the sensor image may be specified as shown in FIG. 11A.

This example is described on the basis of the number of pixels on the sensor image. The number of the pixels on the sensor image in the horizontal direction shown in FIG. 1A is determined to be 1300 in advance. The number of the pixels of the detected vehicle display section D in the horizontal direction on the sensor image is set to 500. The number of the pixels of the aspherical section A in the horizontal direction on the sensor image is set to 800.

At this time, the region of 500 pixels plus 800 pixels in the horizontal direction shown in FIG. 11A is partially compressed and converted into the visual field support image MP. The number of the pixels of the visual field support image MP in the horizontal direction is set to 800 pixels.

The above-mentioned numbers of the pixels are just taken as examples and may be set to other setting values.

In the 1300 pixels in the sensor image in the horizontal direction shown in FIG. 11A, the 800 pixels in the aspherical section A are compressed to 300 pixels. On the other hand, the 500 pixels in the detected vehicle display section D are not compressed in this example. This is because the display magnification of the detected vehicle display section D has been determined to be equal magnification in advance. Hence, the visual field support image MP in which the aspherical section A is shrunk in the horizontal direction is generated as shown in FIG. 11B. The field angle of the 1300 pixels before the compression is also maintained in the visual field support image MP.

As a result, the proportional division ratio on the display (the ratio of the detected vehicle display section D to the aspherical section A=500:300) shown in FIG. 11B is fixed. The state shown in FIG. 11B is assumed to be the initial state of the display. Next, the following movement of the detected vehicle display section D after the initial state will be described.

FIGS. 12A to 12B are views showing the following movement of the detected vehicle display section D in the visual field support image MP. FIG. 12A shows the initial state of the following movement, FIG. 12B shows the state of the following movement, and FIG. 12C shows the end state of the following movement.

The broken line shown on the visual field support image MP on the right side in FIGS. 12A to 12C indicates a predetermined portion serving as a variable threshold value. In this example, the variable threshold value is set virtually as shown in the figure at the center of the detected vehicle display section D in the horizontal direction. However, the variable threshold value may be shifted further to the right or left side of the detected vehicle display section D.

The detected vehicle DC detected by the adjacent vehicle position calculation device 15 is a passing vehicle that passes the own vehicle 100 from behind on a road. The detected vehicle DC is displayed on the detected vehicle display section D shown in FIGS. 12A to 12C so as to move from the left to the right.

After the detected vehicle DC (more specifically, a predetermined portion of the vehicle, for example, the front face (front bumper of the vehicle) thereof has passed the above-mentioned variable threshold value, the detected vehicle DC on the visual field support image MP moves to the right. The movement of the detected vehicle display section D is performed so that the detected vehicle DC (the specified portion thereof) is positioned at the center of the detected vehicle display section D in the left-right direction. In other words, the position of the detected vehicle display section D in the visual field support image MP follows the detected vehicle DC (the specified portion thereof) and moves from the initial state to the right (the following movement state shown in the middle of FIG. 12B).

In accordance with the above-mentioned following movement of the detected vehicle display section D, the aspherical section A is divided into two sections: an aspherical section A1 and an aspherical section A2. However, the proportional division ratio on the display (the ratio of the detected vehicle display section D to the aspherical section A=500:300) remains fixed. For example, the aspherical section A1 serving as the original aspherical section A and existing on the right side of the detected vehicle display section D occupies the region amounting to 150 pixels in the horizontal direction in the following movement state shown in FIG. 12B. The additional aspherical section A2 having appeared so as to compensate for the left region of the detected vehicle display section D occupies the region amounting to 150 pixels in the horizontal direction in the following movement state shown in FIG. 12B. The total number of the pixels of the aspherical sections A1 and A2 is 300 in the horizontal direction. As described above, in accordance with the above-mentioned following movement of the detected vehicle display section D, the numbers of pixels (field angles) of the aspherical sections A1 and A2 to be disposed on the left and right sides of the detected vehicle display section D are changed. The change width of each of the pixel numbers (field angles) of the aspherical sections A1 and A2 is in a range from 0 pixel (0 degrees) to a predetermined design value.

The following movement of the detected vehicle display section D in the visual field support image MP described above is performed until the end state of the following movement shown in the lower section of the FIG. 12C is reached. At the end state of the following movement, the 300 pixels on the left side of the visual field support image MP correspond to the aspherical section A2, and the 500 pixels on the right side thereof correspond to the detected vehicle display section D. The width of the aspherical section A1 is 0 pixel.

The detected vehicle DC passes the own vehicle 100 and moves away to the right side of the visual field support image MP. In other words, the detected vehicle DC is not displayed any more in the visual field support image MP. When the detected vehicle DC is not displayed any more in the visual field support image MP, the display state of the visual field support image MP returns to the initial state shown in FIG. 12A.

Figure 13A:
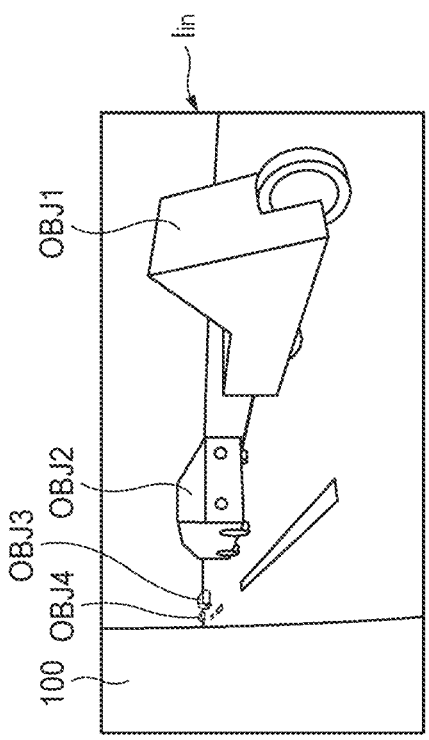
FIGS. 13A to 13C are comparison views in the case that the visual field support image is generated from the input image $I_{in}$, wherein the output image obtained by the conventional technology is compared with the output image obtained by the visual field support image generation device 1B according to the present disclosure.
Figure 13B:
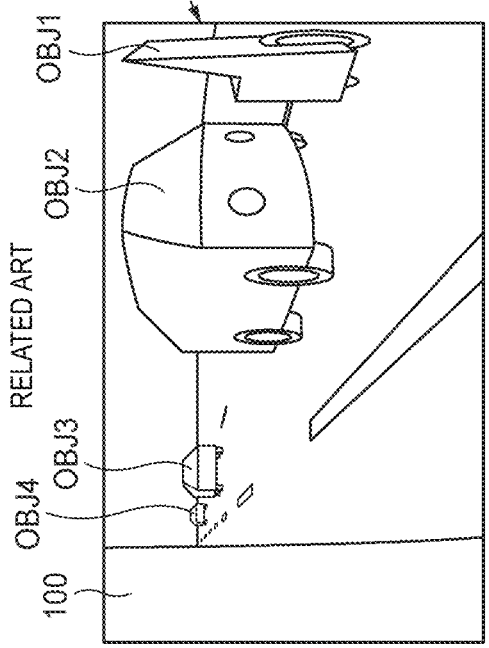
Figure 13C:
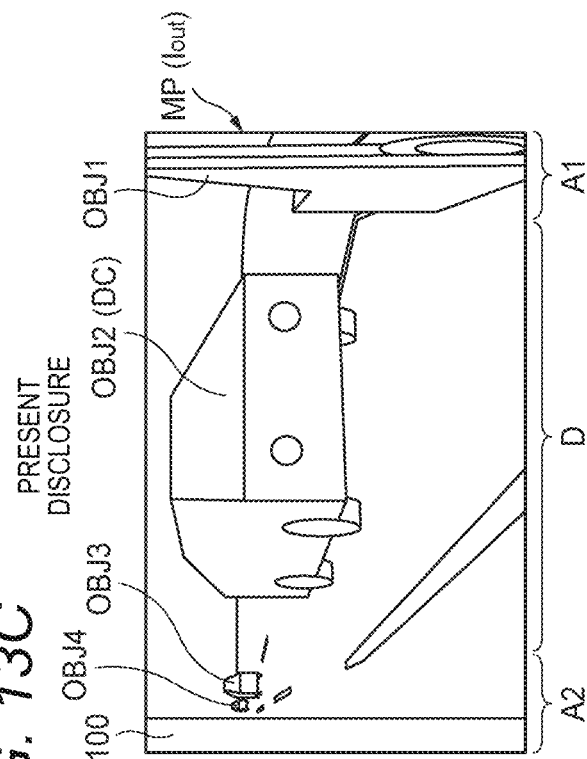

FIGS. 13A to 13C are comparison figures in the case that the visual field support image is generated from the input image $I_{in}$, wherein the output image $I_{out}$ obtained by the conventional technology is compared with the output image $I_{out}$ obtained by the visual field support image generation device 1B according to the present disclosure. FIG. 13A shows the input image $I_{in}$. FIG. 13B shows the output image $I_{out}$ that is generated from the input image $I_{in}$ using the conventional technology. FIG. 13C shows the visual field support image MP (the output image $I_{out}$) that is generated from the same input image $I_{in}$ using the visual field support image generation device 1B according to the present disclosure.

FIG. 13A and FIG. 13B correspond to FIG. 8A and FIG. 8B, respectively.

In FIG. 13B, since the right-side portion of the output image $I_{out}$ corresponding to the aspherical section is compressed, not only the object OBJ1 serving as a vehicle but also the object OBJ2 serving as another vehicle are distorted in shape. Furthermore, as described referring to FIG. 9, as the object OBJ2 advances to the right side of the image, it appears that the object OBJ2 is decelerated abruptly.

On the other hand, in the case of the visual field support image MP (the output image $I_{out}$) shown in FIG. 13C and generated using the visual field support image generation device 1B according to the present disclosure, the shape of the detected vehicle DC (the object OBJ2) is not deformed. This is because the detected vehicle DC is displayed on the detected vehicle display section D. As described above, the detected vehicle display section D is displayed at equal magnification in this example. On the other hand, the aspherical sections A1 and A2 are compressed in the horizontal direction.

Thus, in the visual field support image MP generated using the visual field support image generation device 1B, the detected vehicle DC, which has the highest possibility of collision and to which most attention should be paid, is displayed in a correct shape at a correct position. Furthermore, the situation in which the detected vehicle DC approaches the own vehicle 100 from behind and then passes the own vehicle 100 is displayed at a wide field angle using the visual field support image MP so as to be recognized intuitively, whereby the information of the situation can be provided to the occupant.

Next, the allocation of the detected vehicle DC onto the visual field support image MP will be described.

As described above, the visual field support image MP has the detected vehicle display section D and the aspherical section A1 (and A2). While the detected vehicle display section D is displayed at a predetermined magnification (equal magnification in this example), the aspherical section A1 (and A2) is compressed appropriately to attain a wide field angle in the horizontal direction.

Figure 14A:
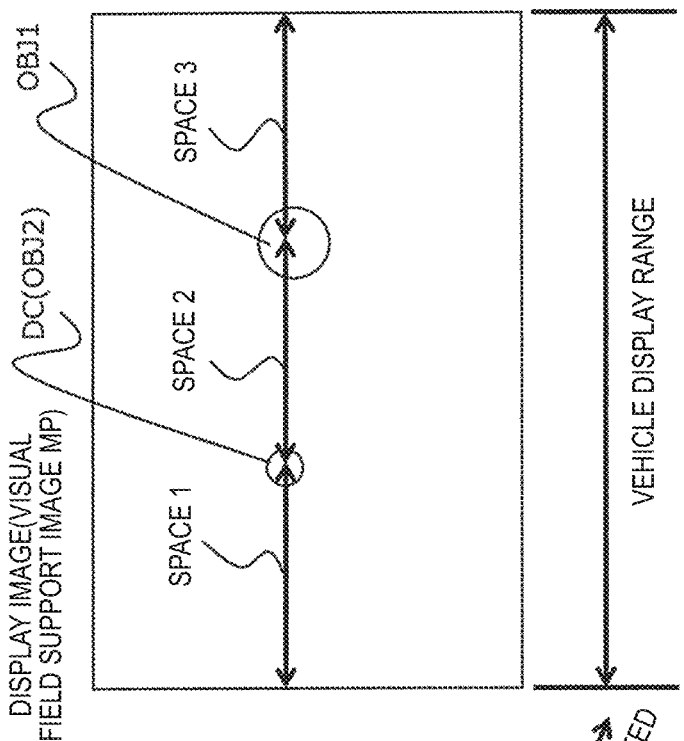
FIGS. 14A and 14B are views showing an embodiment of allocation.
Figure 14B:
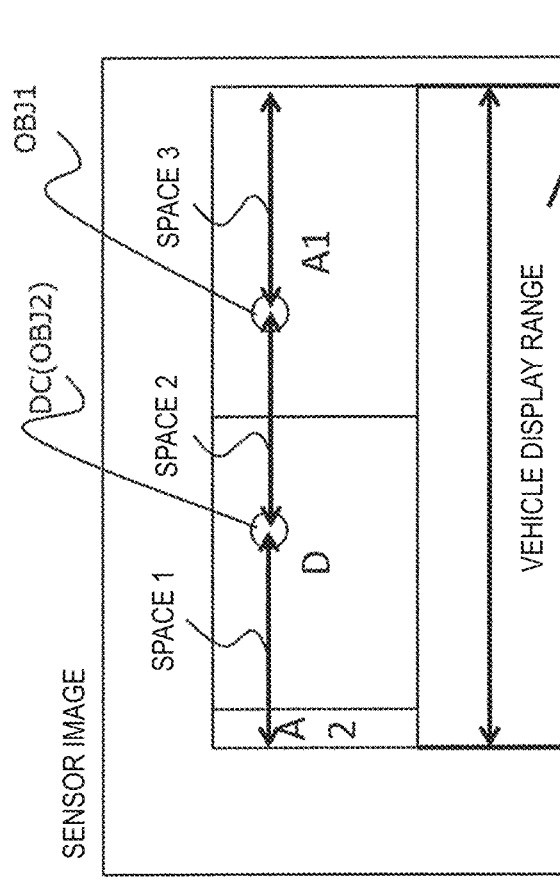

The allocation of the detected vehicle DC onto the visual field support image MP has a degree of freedom. FIGS. 14A and 14B are views showing an embodiment of the allocation; FIG. 14A shows the sensor image, and FIG. 14B shows the visual field support image MP.

In the sensor image shown in FIG. 14A, the whole area formed by the 1300 pixels in the horizontal direction having been described already becomes the range in which the vehicles (the detected vehicle DC and the other vehicles) are displayed.

In FIG. 14A, two circular marks are plotted. One of the marks indicates the position of the detected vehicle DC (the object OBJ2) and the other indicates the position of the vehicle (the object OBJ1) traveling ahead of the detected vehicle DC. The aspherical sections A1 and A2 on the sensor image are not yet compressed.

In the situation shown in FIG. 14A, it is assumed that the range (space 1) from the left end of the sensor image to the detected vehicle DC, the range (space 2) from the detected vehicle DC to the object OBJ1 and the range (space 3) from the object OBJ1 to the right end of the sensor image are equal.

On the basis of this sensor image, the visual field support image generation device 1B can allocate the display position of the detected vehicle DC on the visual field support image MP so that the space 1, the space 2 and the space 3 remain equal. This allocation can be attained by appropriately adjusting the respective widths of the aspherical sections A1 and A2 disposed on the left and right sides and by appropriately adjusting the compression ratios in the aspherical sections A1 and A2.

Since the display position of the detected vehicle DC is allocated as described above, the display position of the detected vehicle DC on the visual field support image MP follows the movement of the detected vehicle DC in the maximum field angle range (1300 pixels) that can be displayed on the visual field support image MP.

Next, equal allocation based on polar coordinates will be described.

FIG. 15 is a view showing allocation based on polar coordinates. As shown on the right side of the figure, the own vehicle 100 and the detected vehicle DC travel in parallel with each other. The detected vehicle DC is traveling on the lane adjacent to the lane of the own vehicle 100 and is going to pass the own vehicle 100.

On the right side of FIG. 15, the visual field range (for example, a field angle of 90 degrees) of the camera 12 provided in the own vehicle 100 is indicated in a fan shape. Furthermore, a plurality of interval lines PCL for dividing the visual field range into equal spaces on the polar coordinates is drawn.

On the other hand, on the left side of FIG. 15, the above-mentioned interval lines PCL are drawn in the visual field support image MP (the field angle in the horizontal direction is 90 degrees in this example) displayed on the display device 13.

Furthermore, the allocation may be performed so that the display position of the detected vehicle DC in the visual field support image MP (on the left side of FIG. 15) coincides with the relative position (on the right side of FIG. 15) between the camera 12 and the detected vehicle DC on the polar coordinates. This allocation can also be attained by appropriately adjusting the respective widths of the aspherical sections A1 and A2 disposed on the left and right sides and by appropriately adjusting the compression ratios in the aspherical sections A1 and A2.

Figure 16:
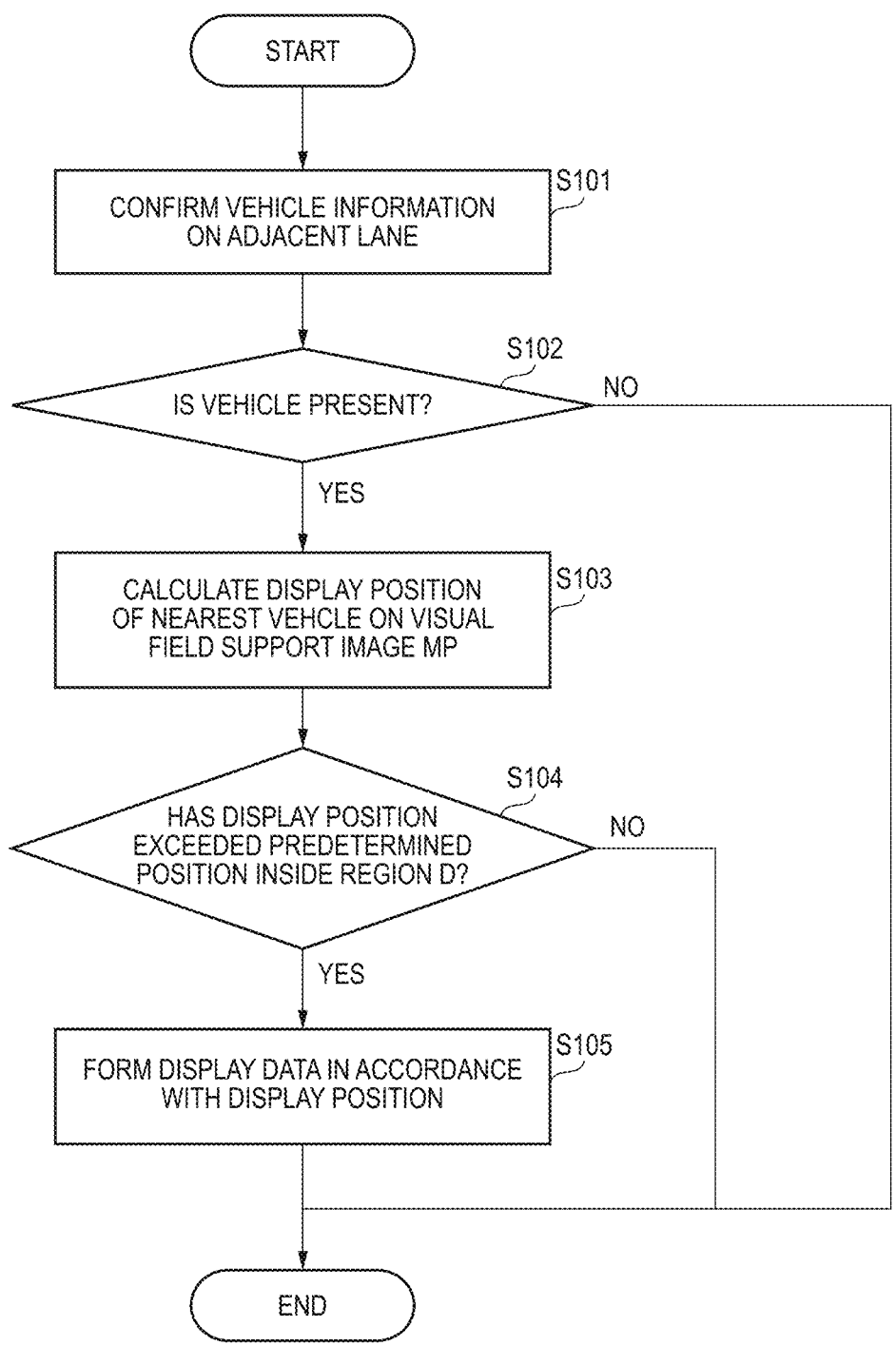
FIG. 16 is a processing flow chart based on the system configuration shown in FIG. 10.

FIG. 16 is a processing flow chart based on the system configuration shown in FIG. 10.

At step S101, the adjacent vehicle position calculation device 15 confirms vehicle information on the adjacent lane.

At step S102, the processing section 11 determines whether a vehicle is present on the adjacent lane. In the case that a vehicle is present (in the case of Yes), the processing advances to step S103. In the case that no vehicle is present (in the case of No), the following movement or the like of the detected vehicle display section D is not performed, and the visual field support image MP is displayed in the above-mentioned initial state (see the upper section of FIG. 12). This display is performed by the display device 13 under the control of the processing section 11.

At step S103, on the basis of the position information of the vehicle (the detected vehicle DC) that is confirmed by the adjacent vehicle position calculation device 15 as the nearest vehicle, the processing section 11 calculates the display position of the vehicle on the visual field support image MP.

At step S104, the processing section 11 determines whether the display position of the detected vehicle DC on the visual field support image MP has exceeded the predetermined position serving as the variable threshold value on the visual field support image MP. In the case that the display position has exceeded the predetermined position (in the case of Yes), the processing advances to step S105. In the case that the display position has not exceeded the predetermined position (in the case of No), the following movement or the like of the detected vehicle display section D is not performed, and the visual field support image MP is displayed in the above-mentioned initial state (see FIG. 12A). This display is performed by the display device 13 under the control of the processing section 11.

At step S105, the processing section 11 forms display data (the visual field support image MP) in accordance with the display position of the detected vehicle DC on the visual field support image MP. In other words, the above-mentioned following movement or the like of the detected vehicle display section D is performed.

With the above-mentioned configuration, the visual field support image MP to be displayed on the display device 13 can be formed into an image having a less sense of incongruity to the driver or the like of the own vehicle 100 and having a wide field angle using the aspherical sections.

Next, a visual field support image generation device 1C capable of expressing the sense of distance on a display image will be described in order to achieve the purpose of the present disclosure, that is, in order to provide a display image giving a less sense of incongruity to the driver or the like and allowing the driver or the like to appropriately grasp the situation in the external world.

In some vehicles, an optical mirror or the above-mentioned optical aspherical mirror is replaced with an on-vehicle camera. The image captured using the on-vehicle camera is appropriately processed and displayed on the display device or the like inside the vehicle as a visual field support image. The driver or the like riding in the vehicle can confirm the situation outside the vehicle by seeing this visual field support image.

In the case of the optical mirror that is not replaced with the on-vehicle camera, the driver or the like can obtain the sense of distance by the movement of the eyeballs due to the parallax of the naked eyes and the reaction of the focus adjustment to a subject.

On the other hand, the on-vehicle camera is generally not provided with a focus adjustment mechanism. Hence, for example, in the case that a subject is captured while the focus is fixed to the infinity, the focus of the obtained image becomes uniform. As a result, the driver or the like cannot obtain a sufficient sense of depth perception from the visual field support image displayed on the display device.

In particular, in the case that the door mirror is replaced with the on-vehicle camera as in a CMS (camera monitoring system) or the like, an image with an insufficient sense of depth perception causes a problem, for example, in a scene when the driver or the like retreats the vehicle while seeing the image on the display device.

For example, let's assume a case in which the driver retreats and parks the vehicle. A parking frame is partitioned using a fence or the like behind the vehicle in some cases. In this case, since the driver cannot obtain a sufficient sense of depth perception from the image on the display device from the viewpoint of the driver, the fence is seen as if the fence is stuck into the vehicle body. In this state, the driver cannot properly determine the stop position when the driver retreats and parks the vehicle.

Hence, in the visual field support image generation device 1C according to the present disclosure, the driver's gaze point on the display device is grasped, the focus is adjusted to the gaze point, and the portions having different distances (long and short distances) from the gaze point are blurred, whereby the sense of distance can be virtually expressed on the visual field support image.

The configuration for virtually expressing the sense of distance on the visual field support image will be described below in detail. The driver or the like can obtain the sense of distance on the visual field support image using the visual field support image generation device 1C according to the present disclosure.

Figure 17:
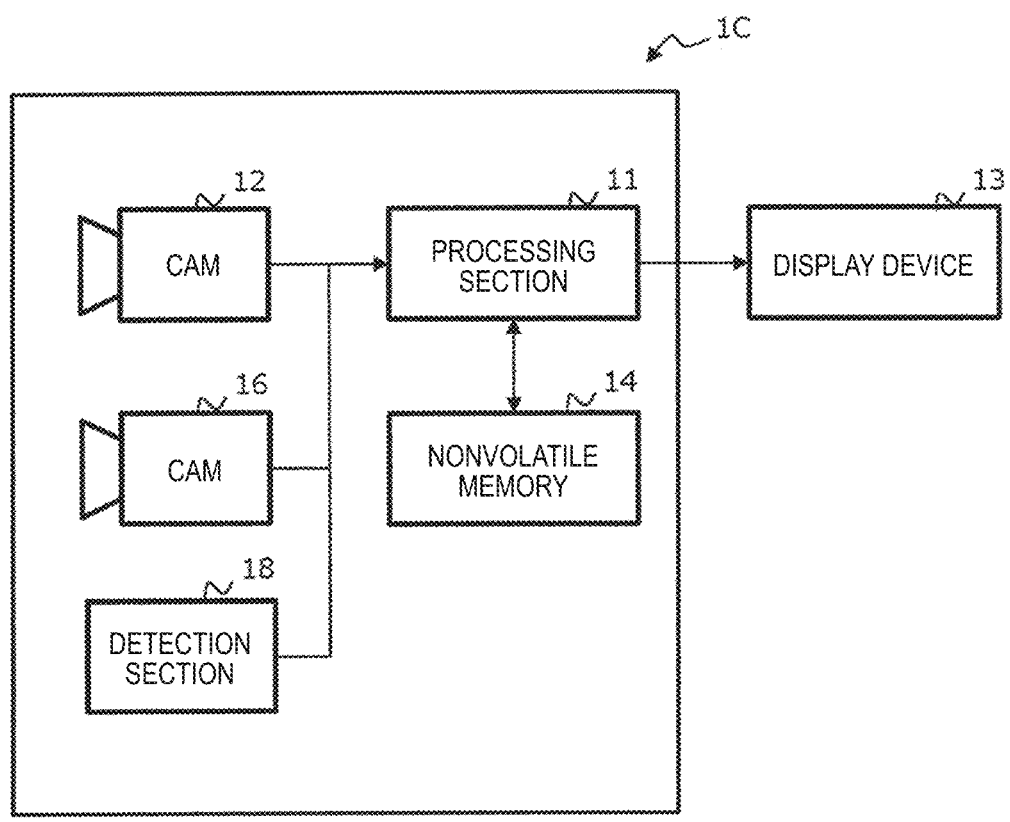
FIG. 17 is a view showing a configuration of a visual field support image generation device 1C according to the present disclosure.

FIG. 17 is a view showing a configuration of the visual field support image generation device 1C according to the present disclosure. The devices shown in FIG. 17 are provided in the own vehicle 100. The hardware configuration shown in FIG. 17 is basically similar to that of the visual field support image generation device 1 described referring to FIG. 3. The embodiment shown in FIG. 17 differs from the embodiment shown in FIG. 3 in that the number of the cameras is increased to two and a detection section 18 is additionally provided. The detection section 18 will be described later. The increase in the number of the cameras from one to two will first be explained.

Figure 18A:
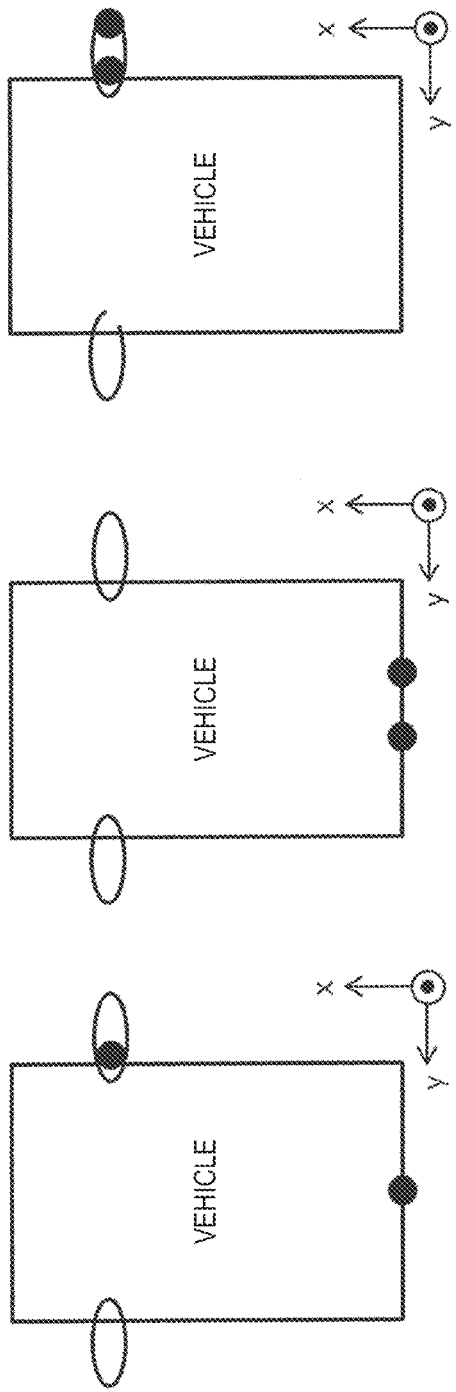
FIGS. 18A and 18B are views showing various installation examples of on-vehicle cameras.
Figure 18B:
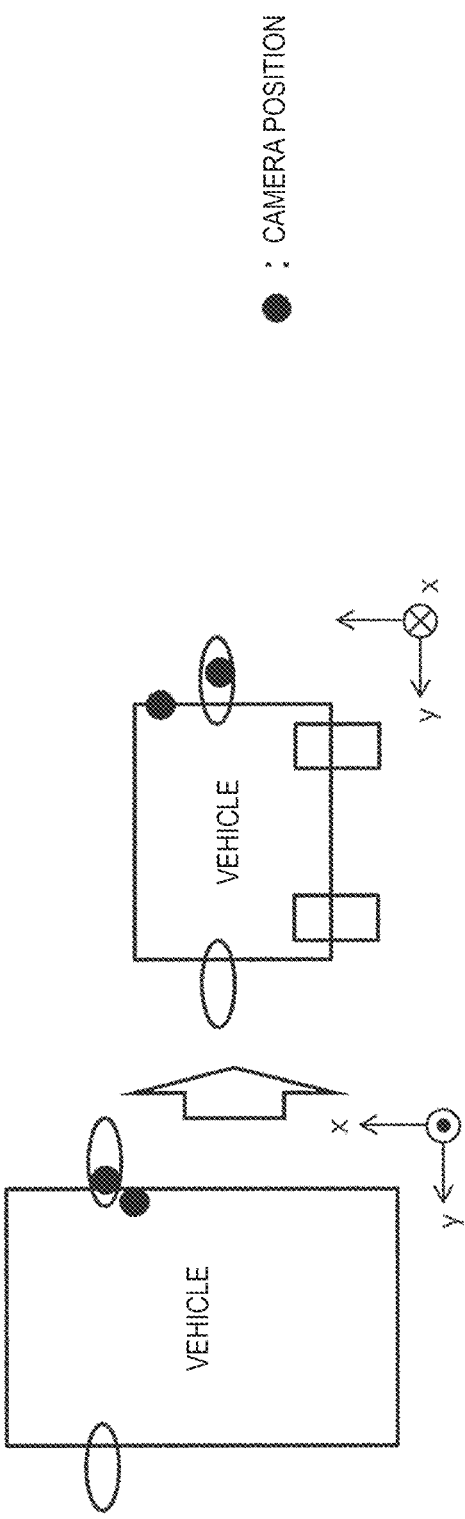

FIGS. 18A and 18B show various installation examples of the on-vehicle cameras. In FIGS. 18A and 18B, an orthogonal coordinate system is added in which the x-axis represents the traveling direction of a vehicle, the y-axis represents the direction of the width of the vehicle, and the z-axis represents the direction of the height of the vehicle.

In the visual field support image generation device 1C according to the present disclosure, two or more cameras are disposed to obtain a parallax detection range. In the examples shown in FIGS. 18A and 18B, two cameras are disposed. The plurality of cameras can be installed at arbitrary positions. As shown in FIG. 18A, one camera may be installed on each of the door mirror of the vehicle and the rear section of the vehicle. Further, two cameras may be installed in the rear section of the vehicle. Two cameras may be installed on the door mirror of the vehicle.

Furthermore, as shown in FIG. 18B, one camera may be installed on each of the door mirror of the vehicle and the portion of the A-pillar adjacent to the roof.

In the case that two cameras are installed, one camera is used as a main camera 12 and the other camera is used as an auxiliary camera 16. The image captured by the main camera 12 is displayed on the display device 13 (monitor) of the CMS (camera monitoring system), and the image captured by the auxiliary camera 16 is used to detect parallax. However, the image captured by the auxiliary camera 16 may be displayed on the display device 13 (monitor) of the CMS (camera monitoring system).

Furthermore, for the pixels in the image captured by the main camera 12 in which distance estimation is made possible, the distance to a subject is estimated using the image of the auxiliary camera 16. An existing distance estimation technology may be used for this distance estimation.

However, since it is not necessary to perform distance estimation for all the pixels in the image captured by the main camera 12, distance estimation may be performed for thinned-out pixels on the main camera 12. As the result of the thinning-out processing, the time required for image processing can be saved.

Next, the detection section 18 will be described referring again to FIG. 17. The detection section 18 is typically a camera for monitoring the eyeballs of the driver or the like, which is installed on the display device 13 of the CMS (camera monitoring system) or installed close to the display device 13. For example, since the driver of the vehicle sees the display device 13 during driving, the detection section 18 monitors the eyeballs of the driver, thereby being capable of detecting which portion (gaze point) of the screen of the display device the driver is gazing at.

After obtaining the information relating to the gaze point from the detection section 18, the processing section 11 estimates gaze coordinates (coordinates corresponding to the gaze point) in the visual field support image MP displayed on the display device 13.

After that, the processing section 11 applies a blur filter corresponding to the distance (long or short distance) calculated by the distance estimation performed by the main camera 12 and the auxiliary camera 16 around the gaze coordinates in the visual field support image MP to the visual field support image MP. The transmission superimposition of white shading may be performed.

More specifically, the blur filter is applied to pixels, the distances of the pixels from the gaze coordinates being larger than a predetermined threshold value (the pixels positioned greatly away from the gaze coordinates). Furthermore, a stronger blur filter may be applied as the distances are larger.

With the above-mentioned configuration, the focus is adjusted to a certain region (a region within a distance not exceeding the threshold value) close to the gaze point on the visual field support image, and the regions around the certain region are significantly blurred as the estimated distance is larger. Hence, when the driver or the like sees the visual field support image MP using the display device 13, he or she can have a sense of distance between the target of the gaze and the other portions.

The above-mentioned predetermined threshold value (for example, 10 meters) and the resolution of the distance according to which the intensity of blur is changed can be changed according to the accuracy of distance detection depending on the parallax in the plurality of cameras and according to the specifications of the cameras. Moreover, the blur filter may be applied in block units formed of a plurality of pixels, instead of pixel units.

As a modification, the gaze point may be changed or fixed, for example, by touching the touch panel screen of a touch-panel type display device 13.

FIGS. 19A and 19B are processing flow charts based on the system configuration shown in FIG. 17. FIG. 19A shows processing for virtually expressing the sense of distance, and FIG. 19B shows luminance dimming processing for the display device 13.

At step S201, the processing section 11 calculates the distance information of the main camera 12 on the basis of the images captured by the main camera 12 and the auxiliary camera 16.

At step S202, the detection section 18 confirms whether the driver or the like gazes at the display device 13 (monitor). In the case that he or she gazes at the display device (in the case of Yes), the processing advances to step S203. In the case that he or she does not gaze at the display device (in the case of No), the processing is ended.

At step S203, the processing section 11 calculates the above-mentioned gaze coordinates. For this calculation processing, the image captured by the main camera 12 and the information relating to the above-mentioned gaze point detected by the detection section 18 are used.

At step S204, the processing section 11 applies the blur filter corresponding to the distance information at the gaze coordinates and the distance information around the gaze coordinates (having been calculated at step S201) to the visual field support image MP. After the application of the filter, the sense of distance is expressed in a pseudo manner in the visual field support image MP.

Next, the luminance dimming processing shown in FIG. 19B will be described. As described above, the detection section 18 shown in FIG. 17 monitors the eyeballs of the driver or the like using the cameras and performs calculation to determine which portion of the screen of the display device 13 (monitor) the driver or the like is gazing at. Hence, the display device 13 (monitor) requires to have brightness to such a degree that the eyeball monitoring can be performed properly.

At step S301, the detection section 18 confirms whether the driver or the like gazes at the display device 13 (monitor). In the case that he or she gazes at the display device (in the case of Yes), the processing advances to step S302. In the case that he or she does not gaze at the display device (in the case of No), the processing advances to step S304.

At step S302, the processing section 11 determines whether the brightness of the display device 13 (monitor) has reached its target brightness. In the case that the brightness has reached the target brightness (in the case of Yes), the brightness is not required to be raised further, and the processing is ended. In the case that the brightness has not reached the target brightness (in the case of No), the processing advances to step 303, and the brightness of the display device 13 (monitor) is raised gradually.

Step S304 is performed in the case that the driver or the like does not gaze at the display device 13 (monitor) (refer to step 301). In this case, the detection section 18 determines whether the non-gazing state has continued for a certain time. In the case that the non-gazing state has continued for a certain time (in the case of Yes), the processing advances to step 305, and the display device 13 (monitor) is dimmed. On the other hand, in the case that the non-gazing state has not continued for a certain time (in the case of No), the dimming is not performed, and the processing is ended. In the case that the driver takes his or her eyes away from the display device 13 (monitor) many times in a short time, if the dimming is performed each time he or she takes his or her eyes away from the display device, the brightness is raised and lowered repeatedly in a short time, thereby causing an unpleasant feeling.

Figure 20A:
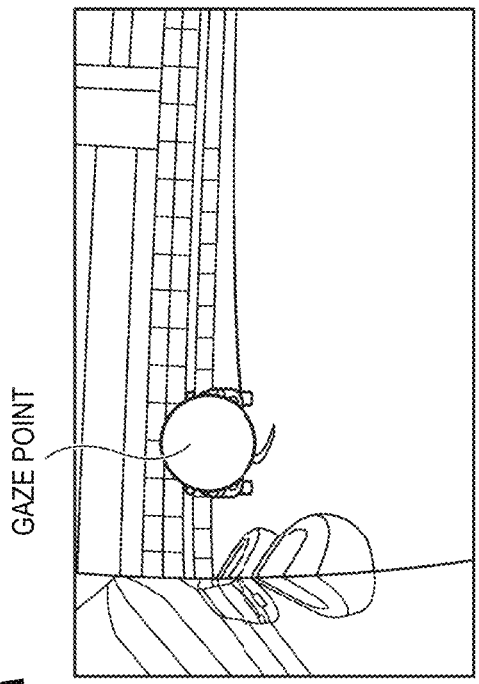
Figure 20C:
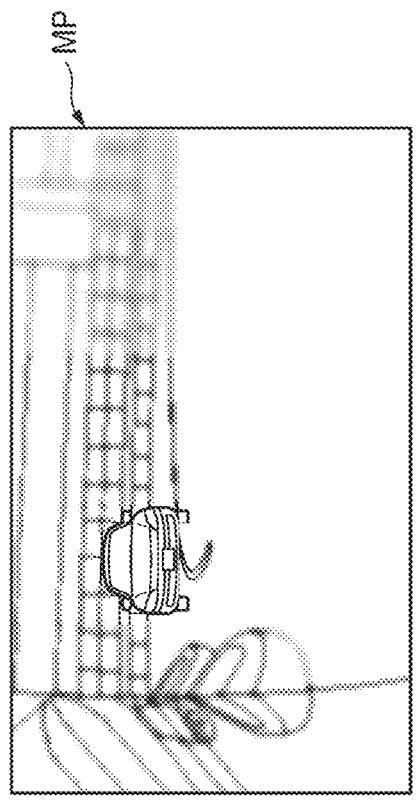
FIG. 20C shows the visual field support image MP in the case that the visual field support image generation device 1C according to the present disclosure is used.
Figure 20B:
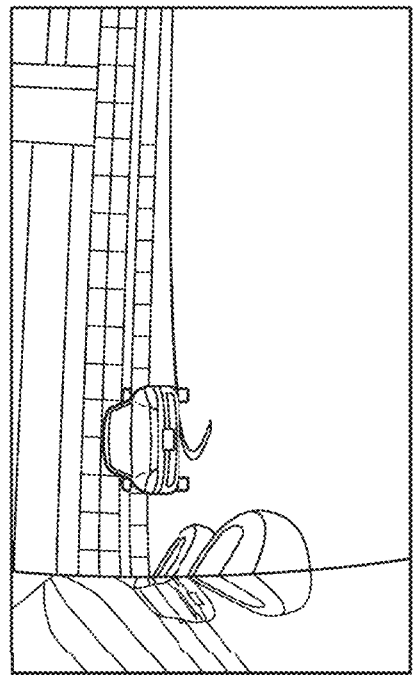
FIG. 20B shows the visual field support image in the case that the visual field support image generation device 1C according to the present disclosure is not used.

FIGS. 20A to 20C are views for comparing visual field support images displayed on the display device 13. FIG. 20A is a view showing the gaze point on the display device, FIG. 20B shows the visual field support image in the case that the visual field support image generation device 1C according to the present disclosure is not used, and FIG. 20C shows the visual field support image MP in the case that the visual field support image generation device 1C according to the present disclosure is used.

In this embodiment, the gaze point of the driver is located at the white circular portion shown in FIG. 20A. With this in mind, FIG. 20B is compared with FIG. 20C. In FIG. 20B, since the focus is adjusted to the entire image, it is difficult to feel the sense of distance. On the other hand, in FIG. 20C, the portions located more than a certain distance away from the gaze point in the visual field support image are blurred, whereby the sense of distance is expressed in a pseudo manner. This gives a sense of reliance to the driver or the like who sees the visual field support image.

Furthermore, a plurality of buildings (three-dimensional objects), not shown, is reflected in the visual field support image in some cases. For example, buildings located in the distance and buildings located nearby are reflected. The focus is herein in the state of being adjusted to the buildings located near the gaze coordinates even after the blur filter is applied. In other words, the driver or the like can recognize which buildings are located at nearly equal distances. This is one of the effects obtained from the visual field support image generation device 1C according to the present disclosure.

In the above-mentioned configuration, the image conversion may be performed such that the compression ratio changes linearly as the deflection angle changes from the horizontal direction of the captured image to the vertical direction of the captured image by using the depth vanishing point included in the captured image as the center. In the case of the linear change, the compression ratio changes gradually depending on the deflection angle, whereby the generated visual field support image becomes natural.

In the above-mentioned configuration, the image conversion may be performed such that the compression ratio increases as the distance from the depth vanishing point is larger. With this configuration, the field angle can be widened naturally while low compression is performed at the peripheral portions of the depth vanishing point to maintain the amount of the information.

In the above-mentioned configuration, compression using a vertically long elliptical lens model may be applied to the image conversion. Since the shape of the vertically long elliptical lens model is similar to the shape of the complete circle lens model being used usually, the sense of incongruity in the display image after the image conversion is reduced. Moreover, although the parameter for specifying the complete circle is only one, that is, the radius r, in the case of the vertically long ellipse, two parameters, that is, the major axis b and the minor axis c, can be used. The vertical and horizontal compression ratios of the image can be changed flexibly by appropriately adjusting the two parameters while reducing the sense of incongruity having been caused conventionally.

In the above-mentioned configuration, the visual field support image generation device 1 may be further equipped with a display section for displaying the visual field support image. With the visual field support image displayed on the display section, the driver or the like can see a natural visual field support image having a wide view in the horizontal direction.

Furthermore, the present disclosure relates to an image conversion method for generating the visual field support image of a vehicle. The image conversion method includes the steps of, on the basis of data indicating the corresponding relationship between the actual image height of an image and the ideal image height of a complete circle lens model, calculating the corresponding relationship between the actual image height of the image and the ideal image height of a geometrically-shaped lens model: calculating the compression ratio of each pixel included in the image on the basis of the corresponding relationship between the actual image height of the image and the ideal image height of the geometrically-shaped lens model; and compressing the image on the basis of the compression ratio of each pixel, and the geometrically-shaped lens model may be formed into a shape such that the horizontal length from the center of the geometrical shape is shorter than the vertical length from the center of the geometrical shape. With the above-mentioned configuration, a visual field support image giving a less sense of incongruity to the driver or the like and allowing the driver or the like to appropriately grasp the situation in the external world can be provided from the input image captured by the camera installed on the door mirror or the like of the vehicle.

In the above-mentioned configuration, with respect to the geometric shape, the distance from the center of the geometric shape may change linearly as the deflection angle changes from the horizontal direction to the vertical direction of the geometric shape. In the case of the linear change, since the compression ratio changes gradually depending on the deflection angle, the image generated using the program also gives a natural feeling to the driver or the like.

In the above-mentioned configuration, the geometric shape may be a vertically long ellipse. Since the shape of the vertically long elliptical lens model is similar to the shape of the complete circle lens model being used usually, the sense of incongruity in the visual field support image after the image conversion is reduced. Moreover, although the parameter for specifying the complete circle is only one, that is, the radius r, in the case of the vertically long ellipse, two parameters, that is, the major axis b and the minor axis c, can be used. The vertical and horizontal compression ratios of the image can be changed flexibly by appropriately adjusting the two parameters while reducing the sense of incongruity having been caused conventionally.

Furthermore, a vehicle is equipped with a visual field support image generation device, a display device and an adjacent vehicle position calculation device; the adjacent vehicle position calculation device acquires the position information of the detected vehicle traveling on the lane adjacent to the lane on which the above-mentioned vehicle serving as the own vehicle travels and being closest to the own vehicle; the visual field support image generation device is equipped with a camera for photographing an image from the own vehicle and a processing section; the processing section converts the captured image captured by the camera, thereby generating a visual field support image; the display device displays the visual field support image: the visual field support image has a detected vehicle display section and an aspherical section: the compression ratio in the aspherical section is higher than the compression ratio in the detected vehicle display section; the detected vehicle is displayed on the detected vehicle display section; and after the display position of the detected vehicle on the detected vehicle display section has exceeded the predetermined position inside the detected vehicle display section, the position of the detected vehicle display section on the visual field support image may follow the movement of the display position of the detected vehicle.

Similarly, the visual field support image generation device for generating the visual field support image of the vehicle is equipped with a camera for photographing an image from a vehicle and a processing section; the processing section acquires, from the adjacent vehicle position calculation device, the position information of the detected vehicle traveling on the lane adjacent to the lane on which the above-mentioned vehicle serving as the own vehicle travels and being closest to the own vehicle; the processing section converts the captured image captured by the camera, thereby generating a visual field support image to be displayed; the visual field support image has a detected vehicle display section and an aspherical section; the compression ratio in the aspherical section is higher than the compression ratio in the detected vehicle display section; the detected vehicle is displayed on the detected vehicle display section; after the display position of the detected vehicle on the detected vehicle display section has exceeded the predetermined position inside the detected vehicle display section, the position of the detected vehicle display section on the visual field support image may follow the movement of the display position of the detected vehicle.

With the above-mentioned configuration, the visual field support image without the sense of incongruity from the viewpoint of the driver or the like can be provided. Furthermore, since the visual field support image still has a portion corresponding to the aspherical section, high viewing angle display is made possible.

In the above-mentioned embodiment, the visual field support image has two aspherical sections, and the two aspherical sections may be disposed on the left and right sides of the detected vehicle display section respectively on the visual field support image. Furthermore, as the position of the detected vehicle display section on the visual field support image follows the movement of the display position of the detected vehicle, the field angles or the numbers of the pixels on the two aspherical sections change, and the change of the field angles or the numbers of the pixels on the two aspherical sections may be performed so that the field angles or the numbers of the pixels on the visual field support image are maintained at predetermined values. With the above-mentioned configuration, even in the case that the position of the detected vehicle display section follows the movement of the display position of the detected vehicle, the second aspherical section can compensate for the field angle of the visual field support image.

In the above-mentioned embodiment, the display position of the detected vehicle on the visual field support image may be allocated so as to follow the movement of the detected vehicle in the maximum field angle range capable of being displayed on the visual field support image. With the above-mentioned configuration, the movement of the detected vehicle on the visual field support image can be displayed without the sense of incongruity.

In the above-mentioned embodiment, the display position of the detected vehicle on the visual field support image may be allocated so as to coincide with the relative position between the camera and the detected vehicle on polar coordinates. With the above-mentioned configuration, the angular position of the detected vehicle on the visual field support image is displayed at a position similar to the position in the case that the occupant of the own vehicle sees the detected vehicle with the naked eyes, whereby the sense of incongruity is reduced.

Furthermore, in a vehicle equipped with a visual field support image generation device, the visual field support image generation device is equipped with a processing section, a first camera, a second camera, a display device for displaying a visual field support image generated on the basis of the image captured by the first camera and a detection section for detecting the gaze point of the occupant riding in the vehicle on the display device: the processing section calculates the distance from the first camera to a subject on the image captured by the first camera using the parallax generated between the first camera and the second camera; the detection section detects the gaze point of the occupant riding in the vehicle on the display device: the processing section estimates the gaze coordinates of the occupant on the visual field support image; and the processing section may apply a blur filter corresponding to the distance to the area around the gaze coordinates on the visual field support image.

Similarly, a visual field support image generation device for generating the visual field support image of a vehicle is equipped with a processing section, a first camera, a second camera, a display device for displaying a visual field support image generated on the basis of the image captured by the first camera and a detection section for detecting the gaze point of the occupant riding in the vehicle on the display device; the processing section calculates the distance from the first camera to a subject on the image captured by the first camera using the parallax generated between the first camera and the second camera; the detection section detects the gaze point of the occupant riding in the vehicle on the display device; the processing section estimates the gaze coordinates of the occupant on the visual field support image; and the processing section may apply a blur filter corresponding to the distance to the area around the gaze coordinates on the visual field support image.

With the above-mentioned configuration, the driver or the like riding in the vehicle can obtain the sense of distance on the visual field support image.

In the above-mentioned configuration, the blur filter may be applied to pixels or pixel blocks located beyond a predetermined distance from the gaze coordinates. Furthermore, the blur filter may be applied so that the blurring is intensified as the distance from the gaze coordinates is larger. With the above-mentioned configuration, the focus is adjusted to the portion close to the gaze coordinates, and the portions away from the gaze coordinates are blurred, whereby the driver or the like riding in the vehicle can obtain the sense of distance more distinctly on the visual field support image. Moreover, since the blurring is intensified as the distance from the gaze coordinates is larger, the attention of the driver or the like is concentrated to the area around the gaze coordinates, whereby the driver or the like can obtain a more distinct sense of distance.

In the above-mentioned configuration, the resolution of the blur filter with respect to the distance may be set according to the parallax detection accuracy levels of the first camera and the second camera. With the above-mentioned configuration, in the case that the parallax detection accuracy levels of the plurality of cameras are high, a more precise sense of distance can be expressed on the visual field support image.

In the above-mentioned configuration, when the detection section detects that the gaze point of the occupant is not located on the display device, the brightness of the display device may be lowered. Furthermore, when the detection section detects that the gaze point of the occupant is located on the display device, the processing section may raise the brightness of the display device gradually. With the above-mentioned configuration, the gaze point can be detected properly while the brightness of the display device is controlled properly depending on whether or not the occupant of the vehicle is seeing the display device.

Although various embodiments have been described above referring to the drawings, the present invention is not limited to these embodiments as a matter of course. It is obvious that persons skilled in the art can perceive various variations or modifications within the scope of claims, and it is understood that such variations and modifications also belong to the technical scope of the present invention. Furthermore, the various components in the above-mentioned embodiments may be combined arbitrarily within the scope of the present invention.

This application is based on and claims priority under 35 USC 119 from Japanese Patent Applications No. 2019-069443, No. 2019-069444, and No. 2019-069445 filed on Mar. 29, 2019, the contents of which are incorporated herein by reference.

What is claimed is:

1. An image processing device configured to be mounted on a vehicle, the image processing device comprising:
    a camera configured to capture a first image of an ambient area of the vehicle; and
    an output configured to be connected to a display and to output a second image to the display, wherein
    the image processing device converts the first image to the second image with a horizontal compression and with a vertical compression, the horizontal compression having a horizontal center in a horizontal direction, the vertical compression having a vertical center in a vertical direction, both the horizontal center and the vertical center equaling to a depth vanishing point of the first image, a first compression coefficient of the horizontal compression being higher than a second compression coefficient of the vertical compression, and
    the output outputs the second image converted from the first image, to the display.

2. The image processing device according to claim 1, further comprising
    a processor including the output, wherein
    the processor of the image processing device converts the first image to the second image with the horizontal compression and with the vertical compression.

3. The image processing device according to claim 1, wherein
    a third compression coefficient of the second image changes linearly from the first compression coefficient to the second compression coefficient on the second image, as a deflection angle changes from the horizontal direction to the vertical direction on the second image.

4. The image processing device according to claim 1, wherein
    the first compression coefficient of the horizontal compression increases with a first distance from the horizontal center in the horizontal direction, and
    the second compression coefficient of the vertical compression increases with a second distance from the vertical center in the vertical direction.

5. The image processing device according to claim 1, wherein
    the image processing device converts the first image to the second image using a vertically long elliptical lens model.

6. The image processing device according to claim 1, further comprising the display configured to display the second image.

7. A control method for an image processing device, the image processing device configured to be mounted on a vehicle, the image processing device including a camera configured to capture a first image of an ambient area of the vehicle, and an output configured to be connected to a display and to output a second image to the display, the control method comprising:
    converting the first image to the second image with a horizontal compression and with a vertical compression, the horizontal compression having a horizontal center in a horizontal direction, the vertical compression having a vertical center in a vertical direction, both the horizontal center and the vertical center equaling to a depth vanishing point of the first image, a first compression coefficient of the horizontal compression being higher than a second compression coefficient of the vertical compression; and
    outputting the second image converted from the first image, to the display, by the output.

8. The control method according to claim 7, wherein
    the image processing device further includes a processor, the processor including the output, and
    the converting of the first image to the second image is by the processor.

9. The control method according to claim 7, wherein
a third compression coefficient of the second image changes linearly from the first compression coefficient to the second compression coefficient on the second image, as a deflection angle changes from the horizontal direction to the vertical direction on the second image.

10. The control method according to claim 7, wherein
the first compression coefficient of the horizontal compression increases with a first distance from the horizontal center in the horizontal direction, and
the second compression coefficient of the vertical compression increases with a second distance from the vertical center in the vertical direction.

11. The control method according to claim 7, wherein
the converting of the first image to the second image uses a vertically long elliptical lens model.

12. The control method according to claim 7, wherein the image processing device further includes the display configured to display the second image.

13. A vehicle comprising:
a camera configured to capture a first image of an ambient area of the vehicle; and
a display configured to display a second image, wherein
the vehicle converts the first image to the second image with a horizontal compression and with a vertical compression, the horizontal compression having a horizontal center in a horizontal direction, the vertical compression having a vertical center in a vertical direction, both the horizontal center and the vertical center equaling to a depth vanishing point of the first image, a first compression coefficient of the horizontal compression being higher than a second compression coefficient of the vertical compression, and
the display displays the second image converted from the first image.

14. The vehicle according to claim 13, further comprising a processor, wherein
the processor of the vehicle converts the first image to the second image with the horizontal compression and with the vertical compression.

15. The vehicle according to claim 13, wherein
a third compression coefficient of the second image changes linearly from the first compression coefficient to the second compression coefficient on the second image, as a deflection angle changes from the horizontal direction to the vertical direction on the second image.

16. The vehicle according to claim 13, wherein
the first compression coefficient of the horizontal compression increases with a first distance from the horizontal center in the horizontal direction, and
the second compression coefficient of the vertical compression increases with a second distance from the vertical center in the vertical direction.

17. The vehicle according to claim 13, wherein
the vehicle converts the first image to the second image using a vertically long elliptical lens model.

* * * * *